(12) United States Patent
Popelka et al.

(10) Patent No.: US 11,399,068 B2
(45) Date of Patent: Jul. 26, 2022

(54) DISTRIBUTING DATA MANAGEMENT SETUP BETWEEN MULTIPLE USERS

(71) Applicant: salesforce.com, inc., San Francisco, CA (US)

(72) Inventors: Aaron M. Popelka, San Francisco, CA (US); Penny N. Tselikis, Indianapolis, IN (US); Sarah Flamion, Newburgh, IN (US)

(73) Assignee: Salesforce, Inc., San Francisco, CA (US)

( * ) Notice: Subject to any disclaimer, the term of this patent is extended or adjusted under 35 U.S.C. 154(b) by 73 days.

(21) Appl. No.: 16/547,463

(22) Filed: Aug. 21, 2019

(65) Prior Publication Data
US 2021/0058469 A1 Feb. 25, 2021

(51) Int. Cl.
| | | |
|---|---|---|
| H04L 67/141 | (2022.01) | |
| H04L 67/60 | (2022.01) | |
| H04L 67/51 | (2022.01) | |
| H04L 67/306 | (2022.01) | |
| H04L 67/00 | (2022.01) | |

(52) U.S. Cl.
CPC ............ *H04L 67/141* (2013.01); *H04L 67/16* (2013.01); *H04L 67/306* (2013.01); *H04L 67/32* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 7,065,493 B1 * | 6/2006 | Homsi | ............ | G06Q 10/06316 |
| | | | | 705/7.26 |
| 7,305,392 B1 * | 12/2007 | Abrams | ................. | G06Q 10/10 |
| | | | | 707/999.009 |

(Continued)

FOREIGN PATENT DOCUMENTS

| | | | | |
|---|---|---|---|---|
| WO | WO-2018141012 A1 * | 8/2018 | ..... | G06Q 10/063112 |
| WO | WO-2018212753 A1 * | 11/2018 | | |

OTHER PUBLICATIONS

B. Shafiq, A. Samuel and H. Ghafoor, "A GTRBAC based system for dynamic workflow composition and management," Eighth IEEE International Symposium on Object-Oriented Real-Time Distributed Computing (ISORC'05), 2005, pp. 284-290, doi: 10.1109/ISORC.2005.1. (Year: 2005).*

(Continued)

*Primary Examiner* — Uzma Alam
(74) *Attorney, Agent, or Firm* — Holland & Hart LLP

(57) ABSTRACT

A cloud platform may an application server that detects activation of an application instance, determines connections between steps of a setup process and one or more users, monitors setup progress, and notifies users when the users are needed to perform one or more setup steps. The techniques enable quick and efficient data processing model setup and configuration (as well as configuration of other computing applications). The cloud platform further supports a landing page (e.g., home page, application interface, etc.) that presents tiles customized based on various metrics such as application use history, attributes associated with the user, setup progress, data processing results, etc. The landing page also enables efficient setup and management because of the customization techniques.

20 Claims, 15 Drawing Sheets

(56) References Cited

U.S. PATENT DOCUMENTS

| | | | | |
|---|---|---|---|---|
| 8,060,932 B2* | 11/2011 | Mohammed | G06F 21/629 726/19 |
| 8,170,901 B2* | 5/2012 | Shukla | G06Q 10/0631 705/7.12 |
| 8,812,423 B1* | 8/2014 | Kurniawati | G06F 21/6218 706/47 |
| 9,807,194 B1* | 10/2017 | Beaty | H04L 67/42 |
| 10,467,050 B1* | 11/2019 | Schmidgall | G06F 9/4881 |
| 2005/0132048 A1* | 6/2005 | Kogan | G06Q 30/0603 709/225 |
| 2006/0206864 A1* | 9/2006 | Shenfield | G06F 8/20 717/107 |
| 2007/0203778 A1* | 8/2007 | Lowson | G06Q 10/06316 705/7.14 |
| 2009/0171961 A1* | 7/2009 | Fredrickson | G06Q 10/06 |
| 2011/0184870 A1* | 7/2011 | Angel | G06F 8/34 707/E17.049 |
| 2013/0138713 A1* | 5/2013 | Sukhyy | G06F 8/30 709/201 |
| 2014/0006078 A1* | 1/2014 | McGauley | G06Q 10/06 709/204 |
| 2014/0223152 A1* | 8/2014 | Deedwaniya | G06F 9/44505 713/1 |
| 2016/0012251 A1* | 1/2016 | Singh | G06F 21/6227 707/783 |
| 2016/0154682 A1* | 6/2016 | Buth | G06F 9/541 718/105 |
| 2016/0232492 A1* | 8/2016 | Nalsky | G06Q 10/103 |
| 2018/0083835 A1* | 3/2018 | Cole | H04L 41/0246 |
| 2018/0307945 A1* | 10/2018 | Haigh | G06N 3/063 |
| 2019/0073206 A1* | 3/2019 | Honda | G06F 21/121 |
| 2019/0108044 A1* | 4/2019 | Coven | G06F 9/4411 |
| 2021/0075671 A1* | 3/2021 | Li | H04W 12/069 |

OTHER PUBLICATIONS

Jianjia He, Zhongwei Gu and Fuyuan Xu, "Role-based modeling and analysis of workflow for SDN," 2011 International Conference on Business Management and Electronic Information, 2011, pp. 254-258, doi: 10.1109/ICBMEI.2011.5914470. (Year: 2011).*

T. Sun, "An Intelligent Wizard for Automatic Workflow Modeling," 2006 IEEE International Conference on Systems, Man and Cybernetics, 2006, pp. 2742-2746, doi: 10.1109/ICSMC.2006.385288. (Year: 2006).*

* cited by examiner

Quick Find

Setup Home

SYSTEM
- Users
- Reports
- Permissions
- ● ● ●

ORCHESTRATION
- Journey
- Journey Template

MESSAGING
- IP Address(es) Config.
- From Address Authentication
- Domain(s)
- Email Sender Profiles
- ● ● ●

⚙ Setup Home — 425-f

Recommended Setup — 425-a

Define Goals
[Get Started]

Set Up your Folders
[Get Started]

— 425-d

🏠 Journey Templates — 425-b
See how Journey Templates can help your users...

✏ View App Exchange Packages
View packages from partners on the appexchange

✉ Inbound Messaging Rules — 425-c
View packages from partners on the appexchange

Todays Performance — 425-e

By BU    By Region    By Priority
○   ○   ○
BU 1   APAC   High
BU 2   AMER   Med.
     EU    Low Emails Sent     Error Rate

Activity — 425-g
○ Victoria Engineer
   edited data model on 8/15/19 ▸

Current Usage

○ Salesforce Licenses 35/35    ○ Marketing Licenses 5/7

> Marketing Features
> Storage
> Other

● ● ●

Data Management Application 420

DISTRIBUTING DATA MANAGEMENT SETUP BETWEEN MULTIPLE USERS

FIELD OF TECHNOLOGY

The present disclosure relates generally to database systems and data processing, and more specifically to distributing data management setup between multiple users.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Setup and configuration of the cloud platform, various aspects of the cloud platform, or other applications (e.g., collectively data management applications) may involve a number of different users, such as information technology administrators, marketing administrators, etc. Due to communication inefficiencies, unclear roles, etc., setup and configuration of data management applications may occur over a long period of time, such as several months.

BRIEF DESCRIPTION OF THE DRAWINGS

FIG. 4 illustrates an example of a user interface system that supports distributing data management setup between multiple users in accordance with aspects of the present disclosure.

DETAILED DESCRIPTION

Figure 1:
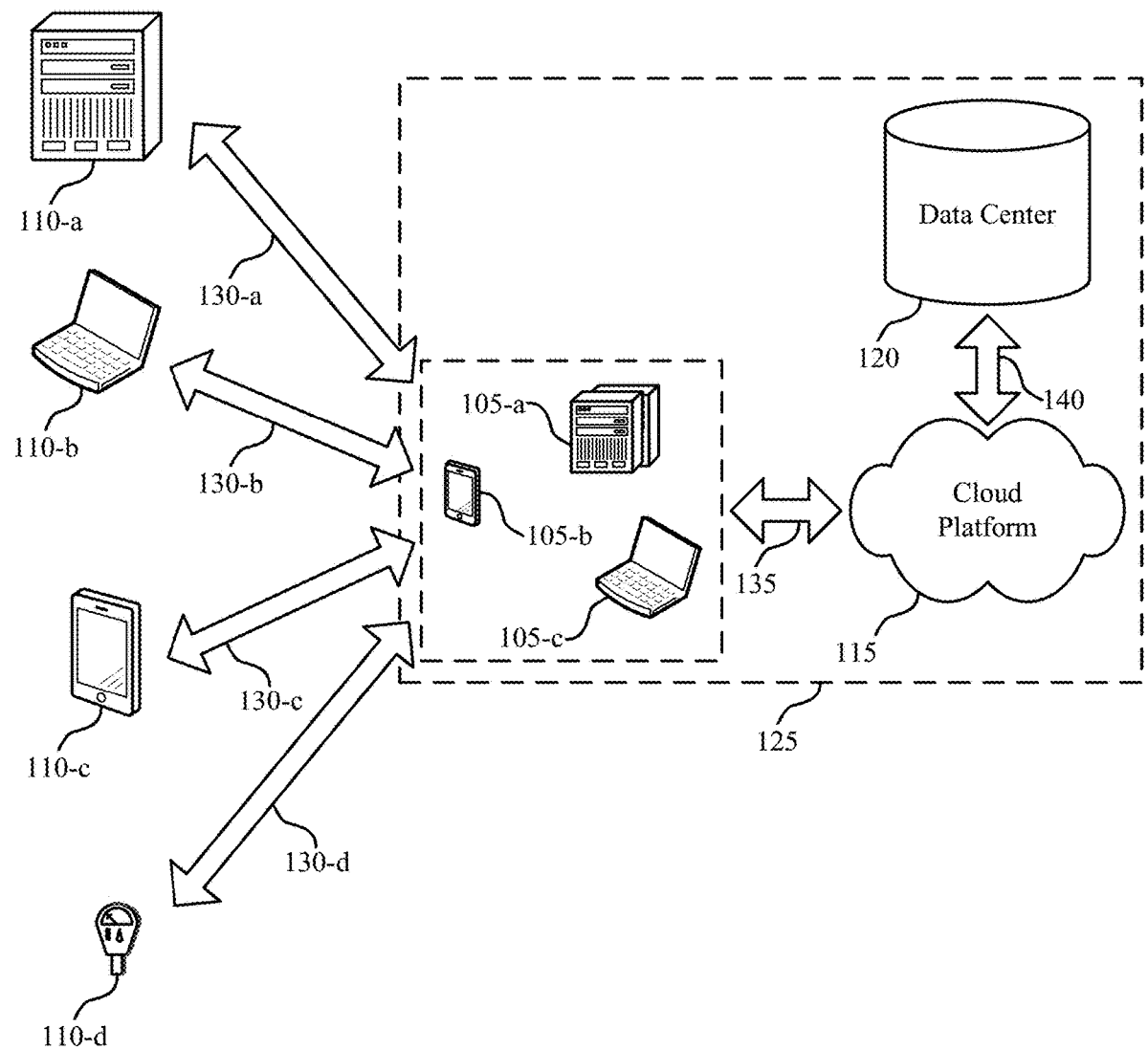
FIG. 1 illustrates an example of a system for generating a data processing model that supports distributing data management setup between multiple users in accordance with aspects of the present disclosure.

Aspects of the disclosure described herein support a customized homepage for data processing model setup, setup flows, and communication features to enable quick and efficient data processing model setup and configuration. The homepage may present customized tiles based on the user's role, and the tiles may display recommended next setup steps. A setup wizard may display various steps in the setup process, completion progress, and entities assigned to complete the various steps. The setup assistant wizard manages setup of various platforms through various different administrators. A first user (e.g., an application administrator) may create other administrative roles and assign different steps of the setup process to different users or personas. When a user completes various steps of the process, the system supports efficient handoff between various users handling the different setup steps. When the steps transition between different administrators, the next administrator is notified that the setup wizard is ready for input. Some steps may be deactivated based on user roles/access rights. An instance of the application (e.g., data processing model) may be created when the steps are completed.

The techniques provide for receiving an activation of an application instance (e.g., logging in to a web application, opening an application at a client device, etc.) at an application server associated with a data processing server. The user may be authorized based at least in part on an attribute (e.g., a role or permission) associated with a user identifier for the user. Responsive to the activation, the application server may generate a plurality of connections by associating a setup step (of a plurality of setup steps for activating the data processing model) with a user identifier of a plurality of user identifiers. These generated connections may be based on attributes associated with one or more of the plurality of user identifiers. The application server may further detect activation of the setup process by one of the plurality of users. When the setup process is activated, the application server may determine the current step of the setup process and detect completion of the current step. Responsive to detecting completion of the current step, the application server may transmit a notification to a user identifier associated with a user identifier connected to the next step in the setup process. Accordingly, these techniques provide for efficient role assignment and handoff between various steps of the setup process. This allows for the data processing model to be efficiently created and activated.

In some cases, the application server may trigger display of a user interface specifying one or more instructions for completion the current step based at least in part on detecting the current steps. Further, the application server may trigger display of a user interface container indicating the plurality of steps. These indications of one or more of the current steps may be rendered unselectable or uneditable based on an attribute associated with one or more of the plurality of user identifiers. For example, a step may be viewable but not editable based on a role (e.g., marketing administrator) associated with the user identifier. Further user interfaces may be triggered that indicate a progress associated with the setup process, the next steps, users that completed steps, time to completion estimations (e.g., for different steps and the setup process as a whole), or a combination of these. Further techniques provide for verifying or authorizing users, displaying a customized homepage based on attributes associated with the user identifiers, and receiving role assignments. In some cases, the customized home page displays tiles based on the user identifier, application usage (e.g., local and global), and other parameters.

Aspects of the disclosure are initially described in the context of an environment supporting an on-demand database service. Aspects of the disclosure are further described with respect to system diagrams, application displays, and process flow diagrams. Aspects of the disclosure are further illustrated by and described with reference to apparatus diagrams, system diagrams, and flowcharts that relate to distributing data management setup between multiple users.

FIG. 1 illustrates an example of a system 100 for cloud computing that supports distributing data management setup between multiple users in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may support a data processing model that may be used to distribute communications, monitor communication feedback, and conduct data analytics on the communications and feedback. The data processing model may support other large scale data analytics on users, user behaviors, attributes, etc. In some cases, the cloud platform 115 may support a customized homepage for data processing model setup, setup flows, data processing model management, and communication management. When a user visits or logs into the home page (e.g., using a web-browser or application), the page may present user interface tiles, which are selected based on application usage data, setup progress, current state of the model, etc. Further, a data processing model may support state management during the setup process, efficient handoff between users, and progress tracking.

Setup of complex computing and communication systems may involve a number of different users, such as information technology administrators, marketing administrators, etc. and a number of different steps. Due to communication inefficiencies, unclear roles, etc., setup and configuration of data management applications may occur over a long period of time, such as several months. Further, the setup processes may not be configured to distribute the various steps to applicable users, manage the setup process, and document progress.

The cloud platform 115 described herein supports an application server that detects activation of an application instance, determines connections between steps of a setup process and one or more users, monitors setup progress, and notifies users when the users are needed to perform one or more setup steps. The techniques enable quick and efficient data processing model setup and configuration (as well as configuration of other computing applications). The cloud platform 115 further supports a landing page (e.g., home page, application interface, etc.) that presents tiles customized based on various metrics such as application use history, attributes associated with the user, setup progress, data processing results, etc. The landing page also enables efficient setup and management because of the customization techniques.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

For example, an administrator or manager of a cloud client 105 may activate an instance of an application using a client device, and an application server (e.g., an application server or data center 120) may detect the application and support the administrator in setting up a data processing model associated with the application. The application sever may support connecting various steps of the setup process with applicable users based on user attributes, management of setup, and enforcing permissions. As various users complete the applicable setup steps, the application and the application server support state management and display of pertinent user interfaces. Accordingly, when a user activates the application, relevant user interfaces that may present setup progress, next steps, etc. may be presented such as to support efficient and timely data processing model setup. Upon completion of the setup steps, the data processing model may be generated, and the user interfaces may present various metrics associated with the data processing model.

Figure 2:
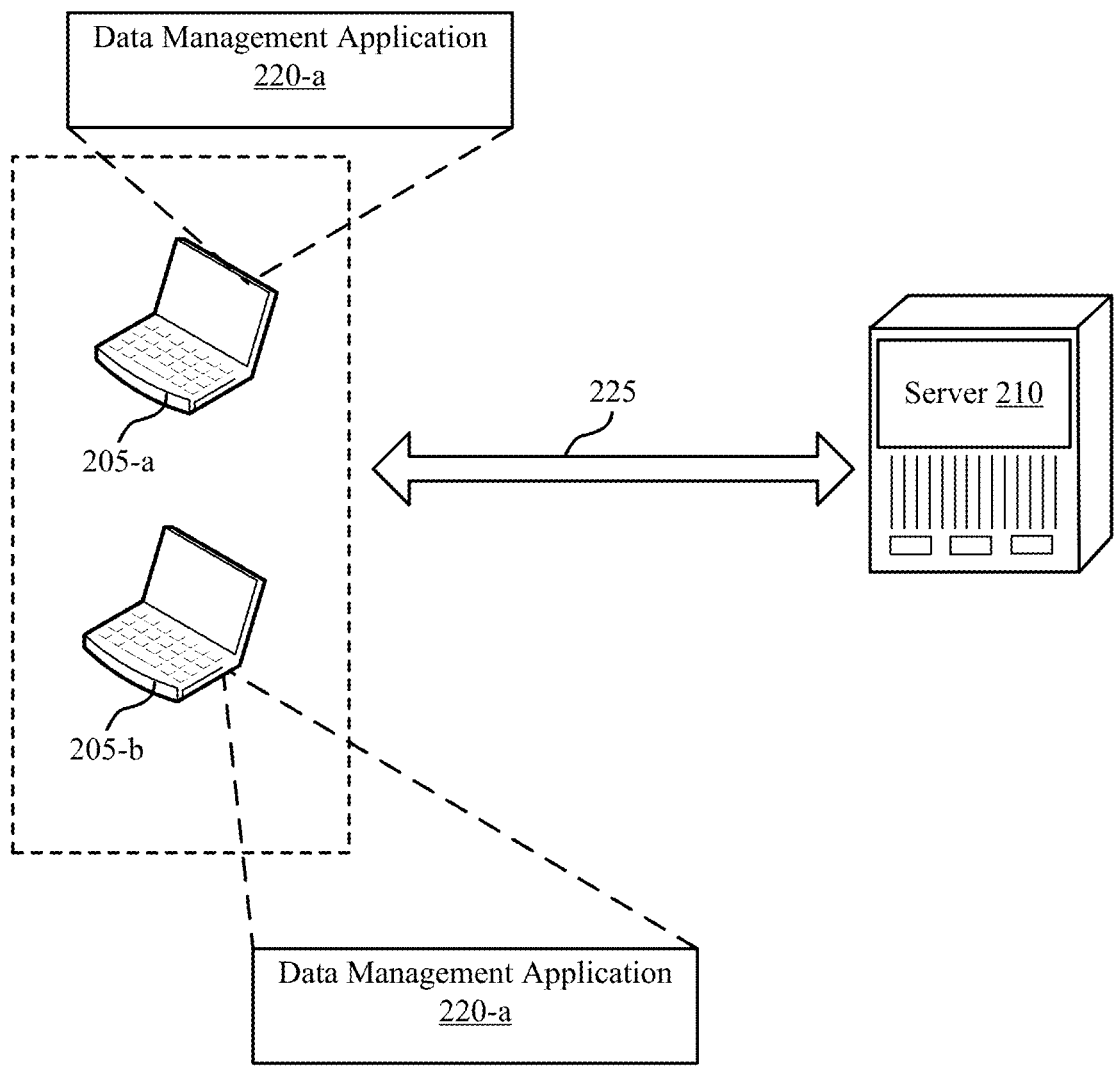
FIG. 2 illustrates an example of a computing system that supports distributing data management setup between multiple users in accordance with aspects of the present disclosure.

FIG. 2 illustrates an example of a computing system 200 that supports distributing data management setup between multiple users in accordance with aspects of the present disclosure. The computing system 200 includes user devices 205 and a server 210. The user devices 205 may be examples of devices associated with cloud clients 105 of FIG. 1, and the server 210 may include aspects of the cloud platform 115 and/or data center 120 of FIG. 1. The server 210 may be an example of an application server and may be associated with a data processing server. The server 210 may support a data management application 220 executable on the user devices 205.

The data management application 220 may be an example of a web application accessible via a web browser, a standalone application, mobile application, or a combination of these. The data management application may support setup and management of a data processing model executable on a data processing server associated with server 210. In one example, the data management application 220 may be an example of a communication application that may be used to manage communications between a cloud client 105 and various users such as contacts 110. The communication application may support selection of users to receive communications (e.g., emails, push notifications, SMS messages), distribution of communications, and communication feedback monitoring. For example, the communication application may determine whether various users open, click, and/or otherwise interact with communications and adjust communication frequencies, content, etc. based on the feedback such as to optimize user interaction with communications.

A user (e.g., cloud client 105) may access the data management application 220-*a* at user device 205-*a*. The user may open, log into, or otherwise activate an instance of the application at the user device 205-*a*. The server 210 may detect activation of the data management application 220-*a*. For example, the client side data management application 220-*a* may communicate a notification of the activation to the server 210 over a communication link 225. In some cases, the user is an authorized user based on attributes associated with a user identifier for the user. For example, the user may log into a user profile at the application, and the user profile may correspond to a user identifier and may be associated with various attributes. In some cases, an attribute may be a role, permission level, or a combination thereof. For example, an administrator may have full access permissions as an attribute, while an intern may have limited access permissions. In some cases, the activation of the application may be an initial activation (e.g., first time logging in or opening the application).

Responsive to detecting the activation of the application, the server 210 may generate connections between setup steps of a setup process and various user identifiers. A plurality of setup steps may be completed before the data processing model is generated, and each step may be connected to a user identifier based on attributes associated with the user identifier. For example, a user identifier may be associated with an information technology (IT) attribute (e.g., role), and the server 210 may connect such a user identifier with one or more steps of the setup process requiring technical expertise. In another example, a user identifier may be associated with a marketing attribute, and the server 210 may connect such a user identifier with one or more steps of the setup process requiring marketing expertise. In some cases, the authorized user may assign roles (e.g., associate attributes) to users using a user interface supported by the data management application 220, and the server 210 may generate the connections based on the assigned roles.

The server 210 may be configured to monitor progress associated with setting up the data processing model and perform certain actions based on the monitored progress. For example, the server 210 may detect activation of the setup process, which may include a user selecting or activating a user interface control associated with the setup process. Based on the activation, the server 210 may trigger display of a setup interface container, which may display the current step, other steps, a predicted time to complete each step, the roles or users associated with each step, instructions to complete each step, etc. In some cases, the user interface may render one or more steps unselectable or uneditable based attributes associated with the active (e.g., logged in) user identifier. For example, an intern may not be able to view/edit some or all of the steps, while an administrator may be able to view the steps. When a user closes or otherwise deactivates the application, the server 210 may store a configuration state associated with the setup process. The configuration state may include one or more parameters that are configured during the setup process. Upon reactivation of the setup process, the configuration state may be retrieved.

When a step is completed by a user identifier connected to the step, the server 210 may support handoff of the setup process to another user/user identifier. For example, upon detection of completion of the step by the connected user at the user device 205-*a*, the server 210 may transmit a notification to a user (e.g., user device) associated with the user identifier connected to the next step in the setup process. In other words, the server may transmit a notification to a user associated with user device 205-*b*, which the user may use to continue the setup process at the data management application 220-*b*. Further, each step of the setup process may be associated with a badge and/or skill tag. When a user completes the steps, then the server 210 may associate the badges and/or skill tag with the user identifier. In some cases, more than one user may complete various steps, and the server may associate the badge and/or skill tag with the multiple users.

The data management application 220-*a* may also support a customized home page, which may be referred to as a landing page or other type of user interface (UI). The home page may display tiles associated with various aspects of the data management application 220. For example, a tile may display a setup summary, which includes setup progress, users completing certain steps, users assigned to uncompleted steps, estimated time to completion, etc. Another tile may display recommended actions, such as installation of a data management packages. Other tiles may display data processing model performance metrics, usage metrics, etc. The tiles may be selected and populated based on historical usage of the data management application 220 (e.g., local or organizational usage or global usage), roles/attributes associated with the active user, etc.

Figure 3:
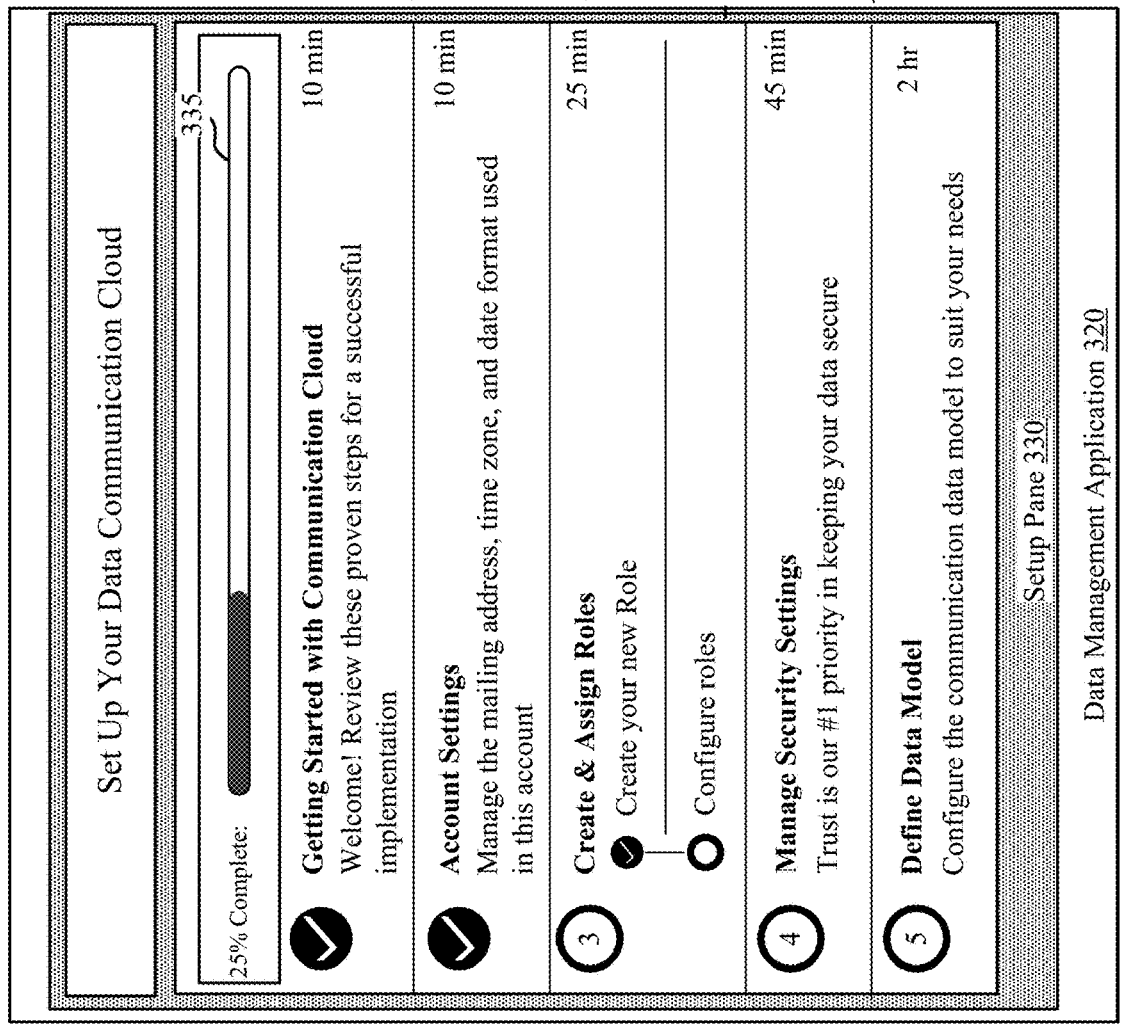
FIG. 3 illustrates an example of a user interface system that supports distributing data management setup between multiple users in accordance with aspects of the present disclosure.

FIG. 3 illustrates an example of a user interface system 300 that supports distributing data management setup between multiple users in accordance with aspects of the present disclosure. The system 300 includes a user device that executes a data management application 320. The user device may be an example of the user device 205 of FIG. 2, and the data management application 320 may be supported by a server, such as server 210 of FIG. 2.

The data management application 320 may display a setup pane 330 (e.g., a UI container). The setup pane 330 may display various steps for completing setup of the data processing model, predicted time of completion of various steps, progress associated with setup, etc. For example, a progress bar 335 displays a completion percentage associated with data processing model setup. Further, a user may select a step to continue the setup process or view aspects of the setup (e.g., when a step is completed). Instructions for completing a step may be displayed when a user selects the step. In some cases, depending on the user viewing the setup pane 330, various steps may be rendered unselectable or uneditable based on attributes associated with the user.

At the "Create & Assign Roles" step, a user may assign users to roles. For example, a user may assign the roles of marketing administrator and salesforce administrator to users using an assignment pane 340, which may be displayed upon activation of the corresponding step. In some cases, the user may input the user profiles (e.g., names, contact information, etc.) and assign the roles to the user profiles. After the roles are input, various steps of the setup process may be connected to the user profiles based on the roles. For example, the "Manage Security Setting" and/or "Define Data Model" steps may be connected to user profiles with a senior level engineer or IT role.

The server (e.g., server 210) may generate the connections and monitor the progress of the setup process. The server 210 may also manage handoff between various users connected to the various steps. For example, the server 210 may detect completion of the "Management Security Settings" step and transmit a notification to a user associated with the next step, "Define Data Model." When the next user receives the notification and/or activates the setup process, the next user may be authenticated (if not already authenticated). Upon completion of the setup process, the data management application 320 may trigger generation of the data processing model. Generation of the model may occur on the associated data processing server. As such, the server 210 may transmit parameters associated with the setup process to the data processing server such that the data processing model may be generated using the parameters.

FIG. 4 illustrates an example of a user interface system 400 that supports distributing data management setup between multiple users in accordance with aspects of the present disclosure. The system 400 includes a user device that executes a data management application 420. The user device may be an example of the user device 205 of FIG. 2, and the data management application 420 may be supported by a server, such as server 210 of FIG. 2. The data management application 420 may be an example of the data management application 220 and 320 of FIG. 2.

In FIG. 4, the data management application 420 displays an example of a user interface as a home page or landing page. The home page may display various tiles 425. The displayed tiles 425 may be selected for display, by the server 210, based on various parameters, such as application usage metrics, roles or attributes associated with an active user, setup progress, etc. For example, a setup tile 425-*d* may be displayed based on the folders not being set up for the particular organization associated with the active user. A usage tile 425-*c* may be selected for display based on the role (e.g., an administrative role) associated with the active user. The performance tile 425-*e* may be displayed for a marketing role. In some cases, tiles may be displayed to encourage a user or organization to utilize provided features. For example, an application exchange tile 425-*b* may be displayed to encourage an organization implementing the data processing model to activate features for the data processing model. A user may access the setup pane 330 of FIG. 3 by activating or selecting a setup tile 425-*f*. An activity tile 425-*g* may display various activities associated with setup and utilization of the data processing model. The activity tile may display users that perform various steps, what steps the users performed, and when the users performed the steps.

In some cases, the application exchange tile 425-*b* may display application (e.g., data package) recommendations based on organization similarities. For example, the server 210 may determine similarities between the users (e.g., organizations) of the instances of the application 420, generate recommendations for data packages, and display the recommendations. The recommendations may be based on data packages that are used by similar organizations or businesses. The recommendations may be further based on use by the particular user/organization. For example, if the user is a "power user" in that they activate various optimizations or other data processing features, then the application exchange tile 425-*b* may display recommendations for other power user services.

The performance tile 425-*e* may display communication metrics for a data processing model associated with communication (e.g., email campaigns, advertisement campaigns, etc.). The metrics may be displayed based on business unit (BU) of the organization, region of communication, and/or priority. The metrics may also include engagement rates (e., open, click, delete rates).

In some cases, an administrative user may configure various display aspects of the data management application 420. For example, a user may select various navigation items and arrange the order in which the navigation items are displayed. Each navigation item may be associated with different features such as content management, campaigns, communication, calendars, etc.

Figure 5:
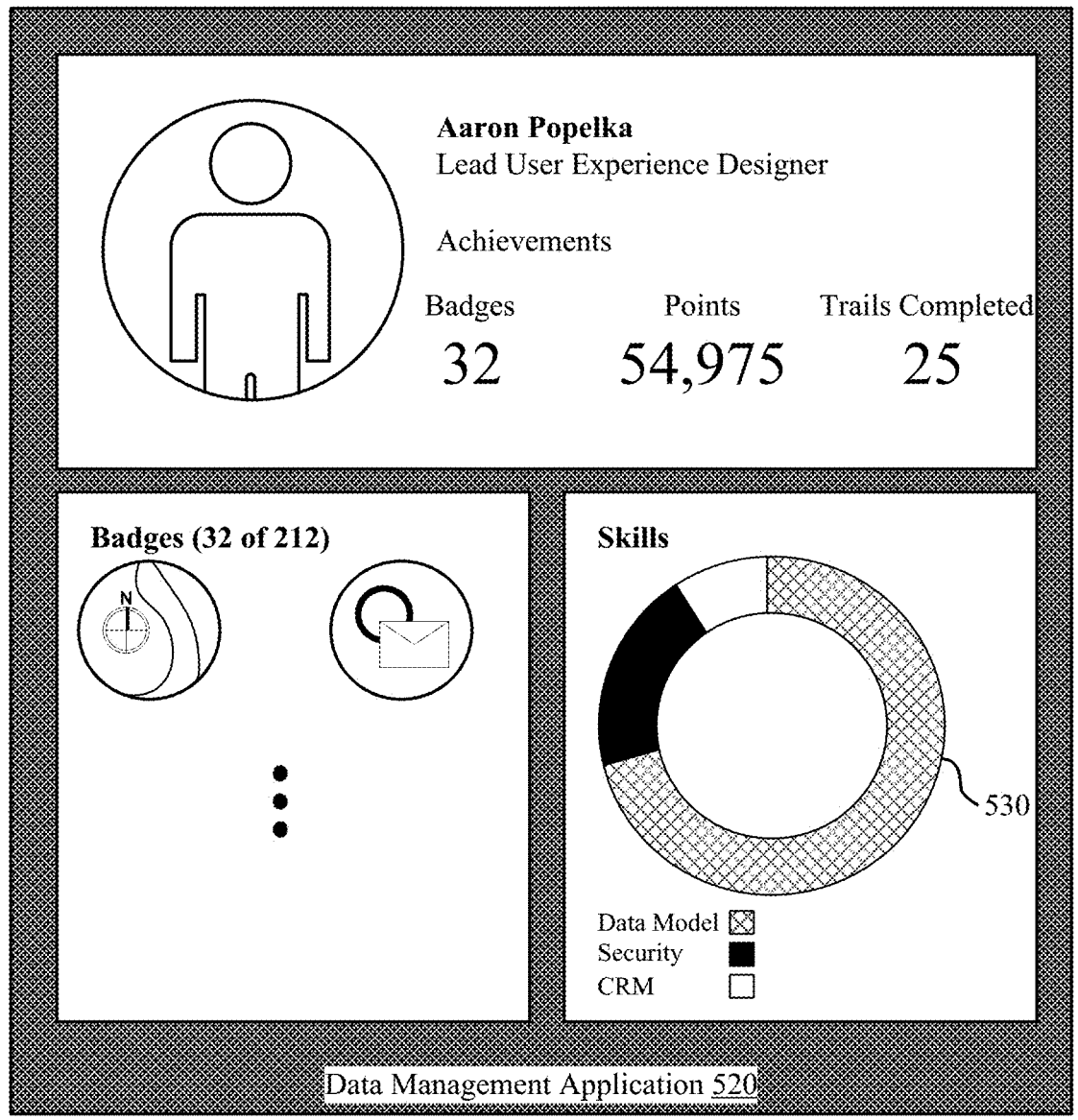
FIG. 5 illustrates an example of a user interface system that supports distributing data management setup between multiple users in accordance with aspects of the present disclosure.

FIG. 5 illustrates an example of a user interface system 500 that supports distributing data management setup between multiple users in accordance with aspects of the present disclosure. The system 500 includes a user device that executes a data management application 520. The user device may be an example of the user device 205 of FIG. 2, and the data management application 520 may be supported by a server, such as server 210 of FIG. 2. The data management application 520 may be an example of the data management application 220, 320, and 420 of FIGS. 2 through 4.

The data management application 520 displays a user profile for a particular user. The profile displays various metrics and indicators. The metrics and indicators may be associated with the user in accordance with various actions performed by the user. For example, each step of the data processing model setup process may be associated with a badge and one or more skills. In some cases, more than one user may complete certain steps of a setup process. Accordingly, when the setup process is complete, then the displayable indicator (e.g., badge) may be associated with each user involved in the setup process. Further, each step may have various skill associations, which may be associated via skill tags. As such, when the steps are completed the skill tags are associated with the users completing the steps. The skills may be visually represented using a skills donut 530.

Accordingly, as various steps of the setup process are completed, the server 210 may associate the respective skills tags to user profiles. Further, the server 210 may trigger display of status indicators at the home page (e.g., activity tile 425-*g*), with users that completed the steps. Accordingly, the server 210 may support real-time or near real-time status updates and skill associations.

Figure 6:
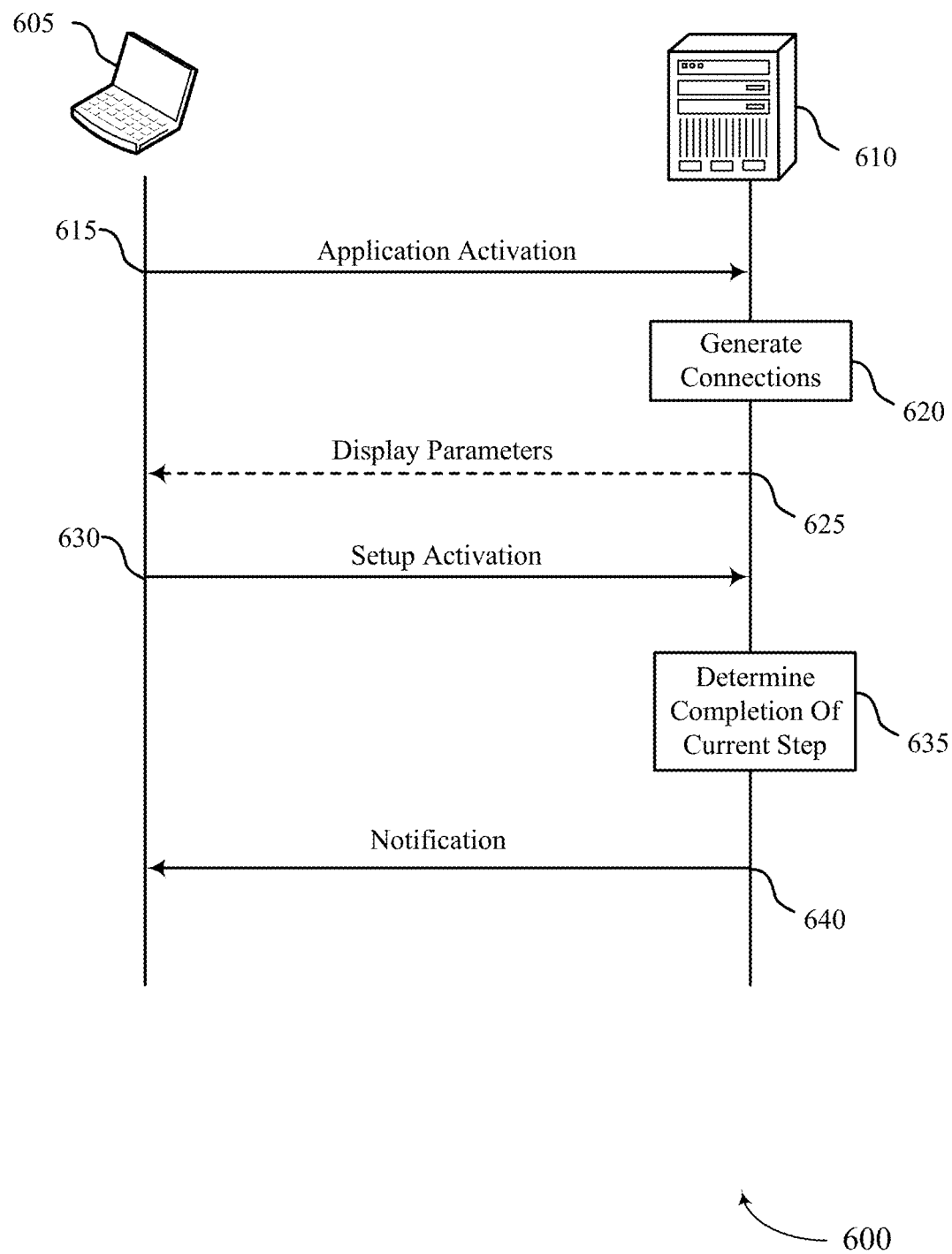
FIG. 6 illustrates an example of a process flow diagram that supports distributing data management setup between multiple users in accordance with aspects of the present disclosure.

FIG. 6 illustrates an example of a process flow diagram 600 that supports distributing data management setup between multiple users in accordance with aspects of the present disclosure. The process flow diagram 600 includes a user device 605 and a server 610, which may be examples of the corresponding devices of FIGS. 1 through 6. The server 610 supports a data management application executable on the user device 605. A user may use the data management application to set up, monitor, and manage a data processing model. In some cases, the server 610 may be an example of an application server, and the application server may be associated with a data processing server on which the data process model may be executed.

At 615, the user device 605 may transmit a notification of an activation of the application the server 610. The server 610 receives the activation of an instance of the application. The activation of the application may be performed by an authorized user, which may be authorized based on an attribute associated with the user.

At 620, the server 610 may generate a plurality of connections by connecting each setup step of a plurality of setup steps with a user identifier of a plurality of user identifiers. The connections may be generated responsive to activation of the application instance. The connections may be selected based at least in part on one or more attributes associated with each user identifier of the plurality of user identifiers. In some cases, the connections may be generated based on assignments of roles to user identifiers.

At 630, the server 610 may detect an activation of a setup process of the application instance by a user associated with one of the plurality of user identifiers. The detection may be based on a notification of a setup activation transmitted by the user device 605 to the server 610. The setup process may include the plurality of setup steps for generation of the data processing model corresponding to the application instance on the data processing server.

At 635, the server 610 may determine that a current step of the plurality of setup steps of the setup process is completed by a second user identifier connected to the current step based at least in part on a second attribute associated with the second user identifier.

At 640, the server 610 may transmit a notification to a third user identifier of the plurality of user identifiers connected to a next step of the plurality of setup steps of the setup process based at least in part on determining that the current step is completed. In some cases, the notification may be transmitted to a different user device 605 that is associated with the user identifier. The notification may be an email, push notification, short message service (SMS) message, etc.

Figure 7:
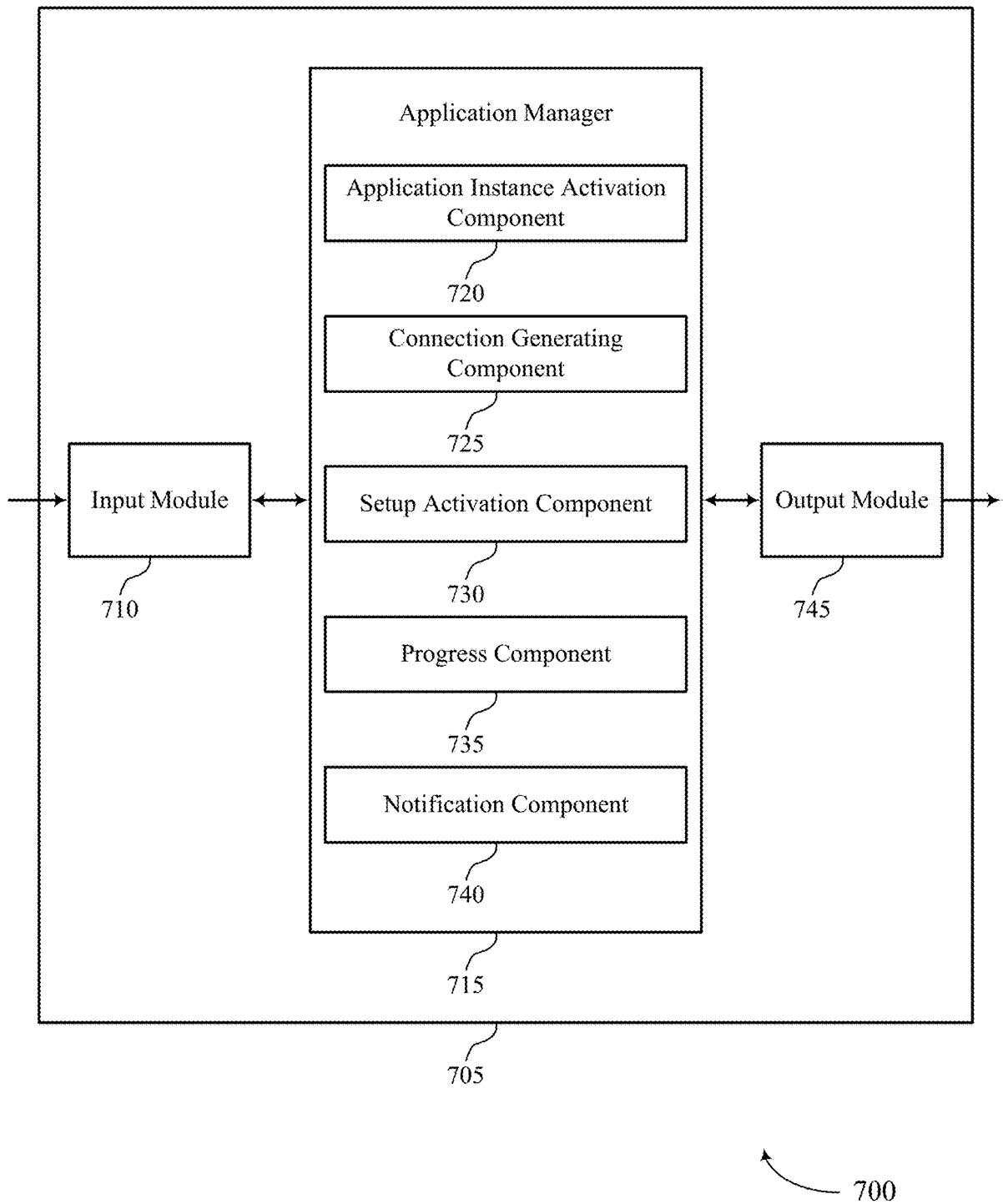
FIG. 7 shows a block diagram of an apparatus that supports distributing data management setup between multiple users in accordance with aspects of the present disclosure.

FIG. 7 shows a block diagram 700 of an apparatus 705 that supports distributing data management setup between multiple users in accordance with aspects of the present disclosure. The apparatus 705 may include an input module 710, an application manager 715, and an output module 745. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the application manager 715. In some cases, the input module 710 may be a component of an input/output (I/O) controller 915 as described with reference to FIG. 9.

The application manager 715 may include an application instance activation component 720, a connection generating component 725, a setup activation component 730, a progress component 735, and a notification component 740. The application manager 715 may be an example of aspects of the application manager 805 or 910 described with reference to FIGS. 8 and 9.

The application manager 715 and/or at least some of its various sub-components may be implemented in hardware, software executed by a processor, firmware, or any combination thereof. If implemented in software executed by a processor, the functions of the application manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The application manager 715 and/or at least some of its various sub-components may be physically located at various positions, including being distributed such that portions of functions are implemented at different physical locations by one or more physical devices. In some examples, the application manager 715 and/or at least some of its various sub-components may be a separate and distinct component in accordance with various aspects of the present disclosure. In other examples, the application manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The application instance activation component 720 may receive an activation of an application instance by an authorized user at an application server associated with a data processing server, the authorized user being authorized based on a first attribute associated with a first user identifier associated with the authorized user.

The connection generating component 725 may generate a set of connections by connecting each setup step of a set of setup steps with a user identifier of a set of user identifiers based on the activation of the application instance, the connections selected based on one or more attributes associated with each user identifier of the set of user identifiers.

The setup activation component 730 may detect an activation of a setup process of the application instance by a user associated with one of the set of user identifiers, where the setup process includes the set of setup steps for generation of the data processing model corresponding to the application instance on the data processing server.

The progress component 735 may determine that a current step of the set of setup steps of the setup process is completed by a second user identifier connected to the current step based on a second attribute associated with the second user identifier.

The notification component 740 may transmit a notification to a third user identifier of the set of user identifiers connected to a next step of the set of setup steps of the setup process based on determining that the current step is completed.

The output module 745 may manage output signals for the apparatus 705. For example, the output module 745 may receive signals from other components of the apparatus 705, such as the application manager 715, and may transmit these signals to other components or devices. In some specific examples, the output module 745 may transmit output signals for display in a user interface, for storage in a database or data store, for further processing at a server or server cluster, or for any other processes at any number of devices or systems. In some cases, the output module 745 may be a component of an I/O controller 915 as described with reference to FIG. 9.

Figure 8:
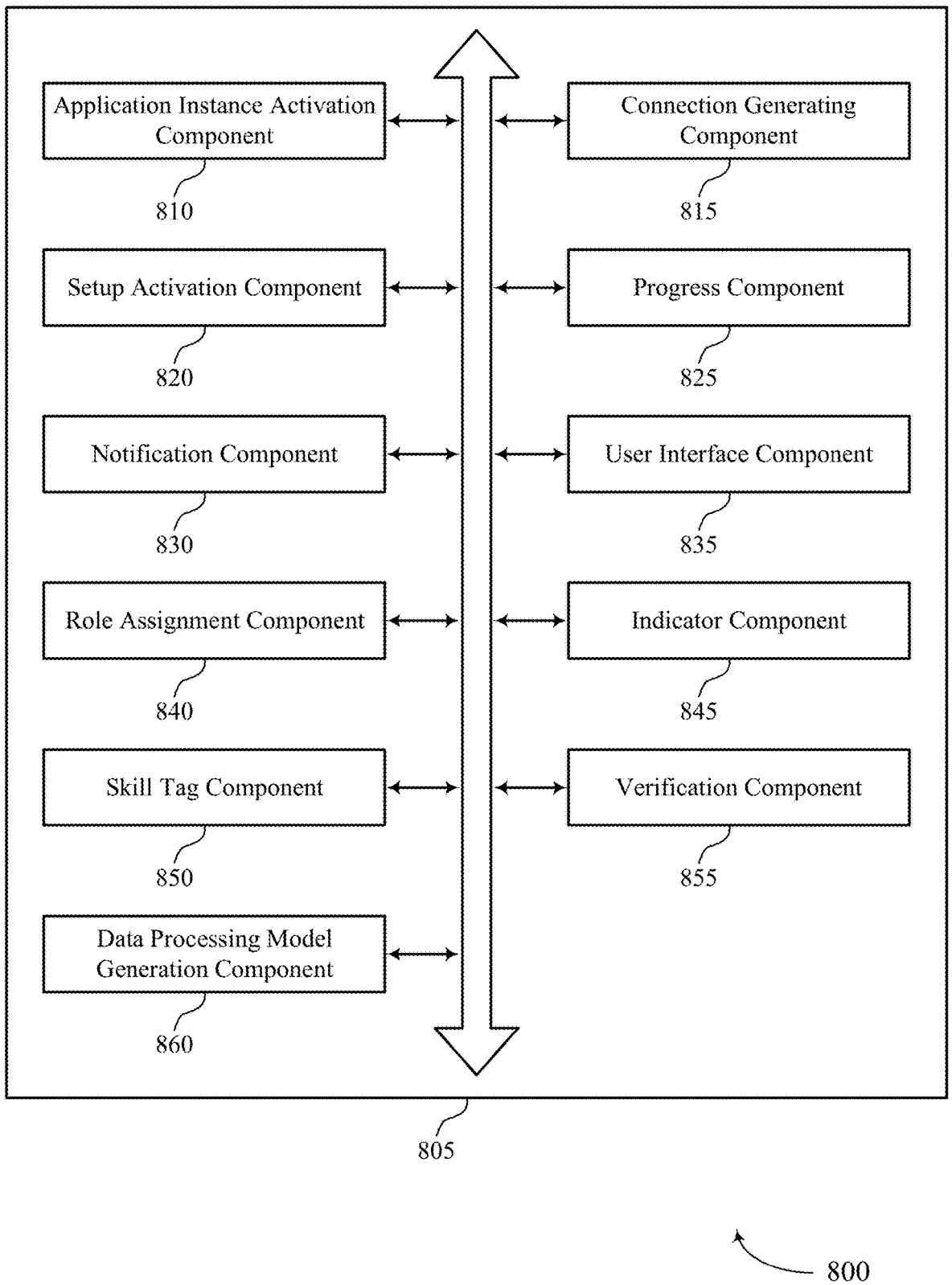
FIG. 8 shows a block diagram of an application manager that supports distributing data management setup between multiple users in accordance with aspects of the present disclosure.

FIG. 8 shows a block diagram 800 of an application manager 805 that supports distributing data management setup between multiple users in accordance with aspects of the present disclosure. The application manager 805 may be an example of aspects of an application manager 715 or an application manager 910 described herein. The application manager 805 may include an application instance activation component 810, a connection generating component 815, a setup activation component 820, a progress component 825, a notification component 830, an user interface component 835, a role assignment component 840, an indicator component 845, a skill tag component 850, a verification component 855, and a data processing model generation component 860. Each of these modules may communicate, directly or indirectly, with one another (e.g., via one or more buses).

The application instance activation component 810 may receive an activation of an application instance by an authorized user at an application server associated with a data processing server, the authorized user being authorized based on a first attribute associated with a first user identifier associated with the authorized user.

The connection generating component 815 may generate a set of connections by connecting each setup step of a set of setup steps with a user identifier of a set of user identifiers based on the activation of the application instance, the connections selected based on one or more attributes associated with each user identifier of the set of user identifiers.

The setup activation component 820 may detect an activation of a setup process of the application instance by a user associated with one of the set of user identifiers, where the setup process includes the set of setup steps for generation of the data processing model corresponding to the application instance on the data processing server. In some examples, the setup activation component 820 may detect an activation of the setup process by the third user identifier.

The progress component 825 may determine that a current step of the set of setup steps of the setup process is completed by a second user identifier connected to the current step based on a second attribute associated with the second user identifier. In some examples, the progress component 825 may determine the current step of the set of steps.

In some examples, the progress component 825 may detect completion of each setup step of the set of setup steps by the corresponding user identifier. In some examples, the progress component 825 may store a configuration state of the setup process at the application server responsive to determining that the current step is completed.

In some examples, the progress component 825 may retrieve the configuration state of the setup process based on detecting the activation of the setup process by the third user identifier.

The notification component 830 may transmit a notification to a third user identifier of the set of user identifiers connected to a next step of the set of setup steps of the setup process based on determining that the current step is completed. The user interface component 835 may trigger display, at a client system, of a user interface control indicating the current step.

In some examples, the user interface component 835 may detect activation of the user interface control by the second user identifier. In some examples, the user interface component 835 may trigger display, at the client system, a user interface specifying one or more instructions for completing the current step.

In some examples, the user interface component 835 may trigger display of a user interface container indicating the set of steps of the setup process responsive to detecting activation of the setup process, where one or more of the set of steps are rendered unselectable or uneditable based on an attribute associated with the one of the set of user identifiers.

In some examples, the user interface component 835 may trigger display of a user interface container indicating a progress associated with the setup process, the next step in the setup process, one or more user identifiers associated with completed steps of the setup process, one or more times associated with completion of one or more steps of the setup process, or a combination thereof.

In some examples, the user interface component 835 may trigger display of a set of user interface tiles responsive to detecting activation of the activation of the application instance, where the set of user interface tiles includes a recommended application tile, a data processing model metrics tile associated with the data processing model, a setup process progress tile, a recommended setup process tile, or a combination thereof.

In some cases, the set of user interface tiles is determined based on utilization metrics of the application, utilization metrics of utilization of the application instance by one or more of the set of user identifiers, a role associated with the authorized user, or a combination thereof.

The role assignment component 840 may receive an assignment of a role to each of the set of user identifiers, where the connections are selected based on the assignment of the role.

The indicator component 845 may generate a displayable indicator upon completion of each of the set of steps by one or more of the set of user identifiers.

In some examples, the indicator component 845 may associate the displayable indicator with the one or more of the set of user identifiers.

In some cases, each step of the set of steps is associated with at least one skill tag, and where each of the one or more of the set of user identifiers that completes a step is further associated with the corresponding skill tag.

The verification component 855 may verify a user associated with the third user identifier based on the detected activation of the setup process.

The data processing model generation component 860 may generate the data processing model responsive to detecting completion of each step of the set of setup steps, where the data processing model is configured based on selections, by the corresponding user identifier, of one or more configuration parameters during the setup process.

Figure 9:
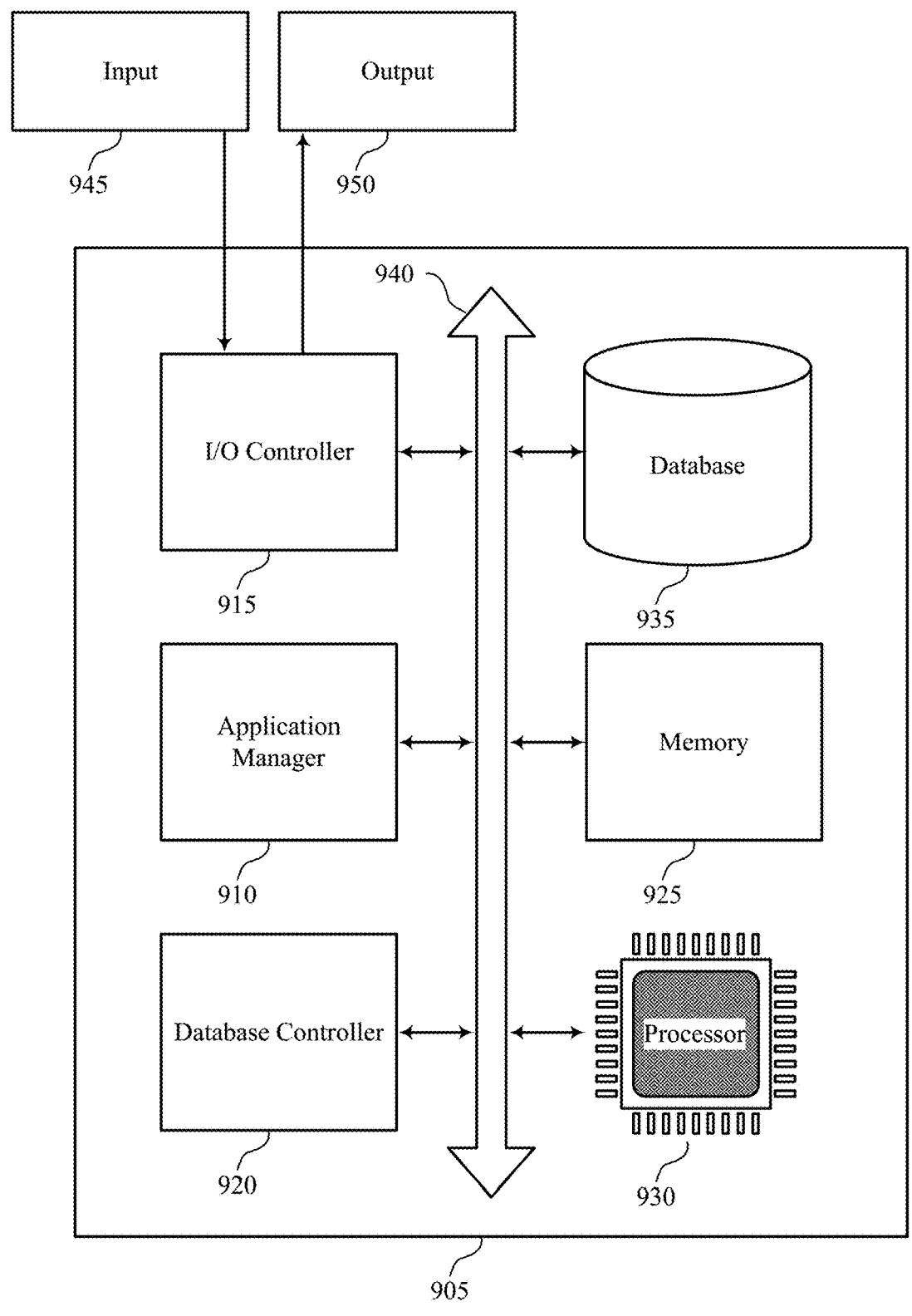
FIG. 9 shows a diagram of a system including a device that supports distributing data management setup between multiple users in accordance with aspects of the present disclosure.

FIG. 9 shows a diagram of a system 900 including a device 905 that supports distributing data management setup between multiple users in accordance with aspects of the present disclosure. The device 905 may be an example of or include the components of an application server or an apparatus 705 as described herein. The device 905 may include components for bi-directional data communications including components for transmitting and receiving communications, including an application manager 910, an I/O controller 915, a database controller 920, memory 925, a processor 930, and a database 935. These components may be in electronic communication via one or more buses (e.g., bus 940).

The application manager 910 may be an example of an application manager 715 or 805 as described herein. For example, the application manager 910 may perform any of the methods or processes described above with reference to FIGS. 7 and 8. In some cases, the application manager 910 may be implemented in hardware, software executed by a processor, firmware, or any combination thereof The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting distributing data management setup between multiple users).

Figure 10:
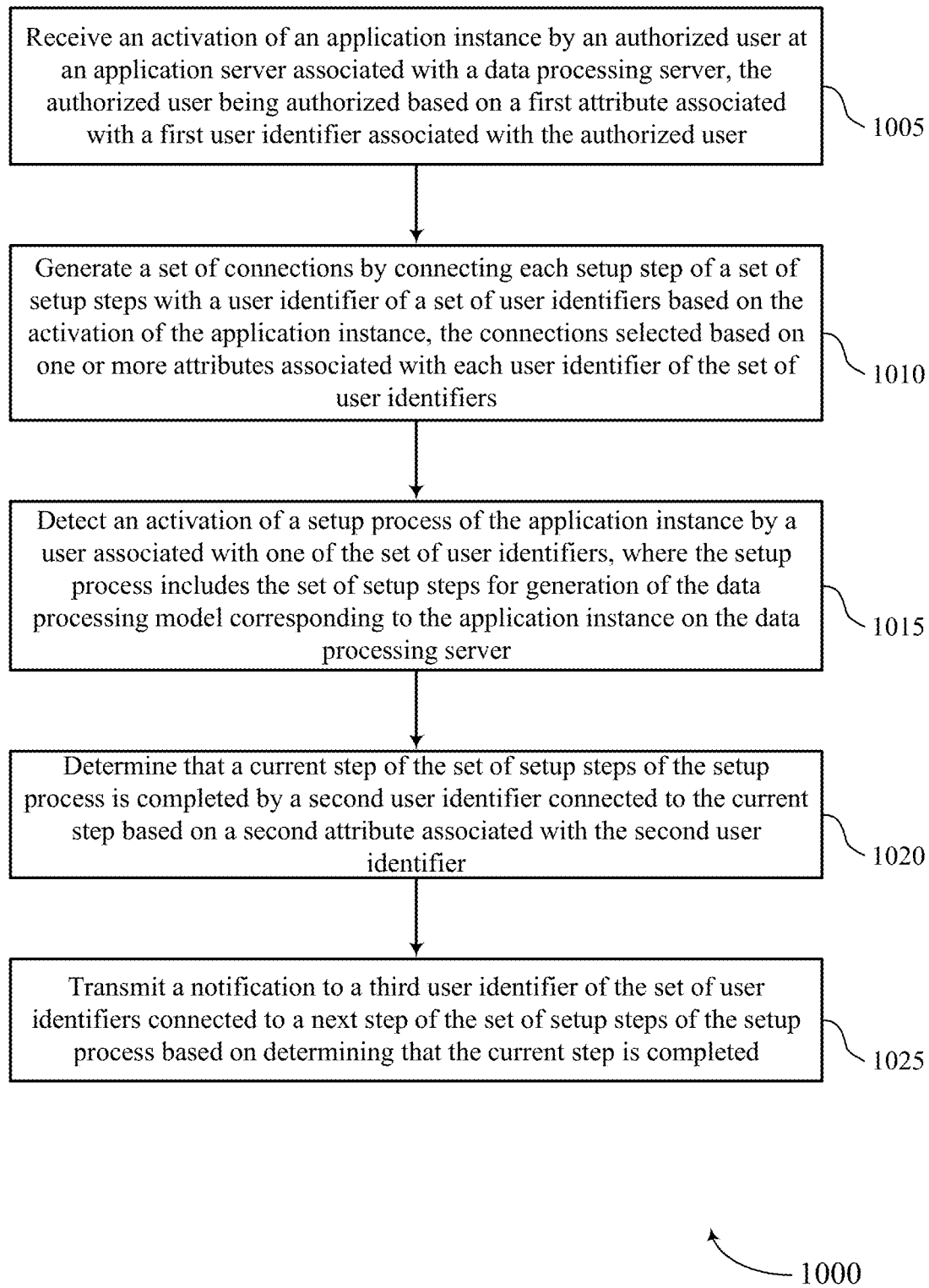
FIGS. 10 through 15 show flowcharts illustrating methods that support distributing data management setup between multiple users in accordance with aspects of the present disclosure.

FIG. 10 shows a flowchart illustrating a method 1500 that supports distributing data management setup between multiple users in accordance with aspects of the present disclosure. The operations of method 1500 may be implemented by an application server or its components as described herein. For example, the operations of method 1500 may be performed by an application manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1505, the application server may receive an activation of an application instance by an authorized user at an application server associated with a data processing server, the authorized user being authorized based on a first attribute associated with a first user identifier associated with the authorized user. The operations of 1505 may be performed according to the methods described herein. In some examples, aspects of the operations of 1505 may be performed by an application instance activation component as described with reference to FIGS. 7 through 9.

At 1510, the application server may generate a set of connections by connecting each setup step of a set of setup steps with a user identifier of a set of user identifiers based on the activation of the application instance, the connections selected based on one or more attributes associated with each user identifier of the set of user identifiers. The operations of 1510 may be performed according to the methods described herein. In some examples, aspects of the operations of 1510 may be performed by a connection generating component as described with reference to FIGS. 7 through 9.

At 1515, the application server may detect an activation of a setup process of the application instance by a user associated with one of the set of user identifiers, where the setup process includes the set of setup steps for generation of the data processing model corresponding to the application instance on the data processing server. The operations of 1515 may be performed according to the methods described herein. In some examples, aspects of the operations of 1515 may be performed by a setup activation component as described with reference to FIGS. 7 through 9.

At 1520, the application server may determine that a current step of the set of setup steps of the setup process is completed by a second user identifier connected to the current step based on a second attribute associated with the second user identifier. The operations of 1520 may be performed according to the methods described herein. In some examples, aspects of the operations of 1520 may be performed by a progress component as described with reference to FIGS. 7 through 9.

At 1525, the application server may transmit a notification to a third user identifier of the set of user identifiers connected to a next step of the set of setup steps of the setup process based on determining that the current step is completed. The operations of 1525 may be performed according to the methods described herein. In some examples, aspects of the operations of 1525 may be performed by a notification component as described with reference to FIGS. 7 through 9.

Figure 11:
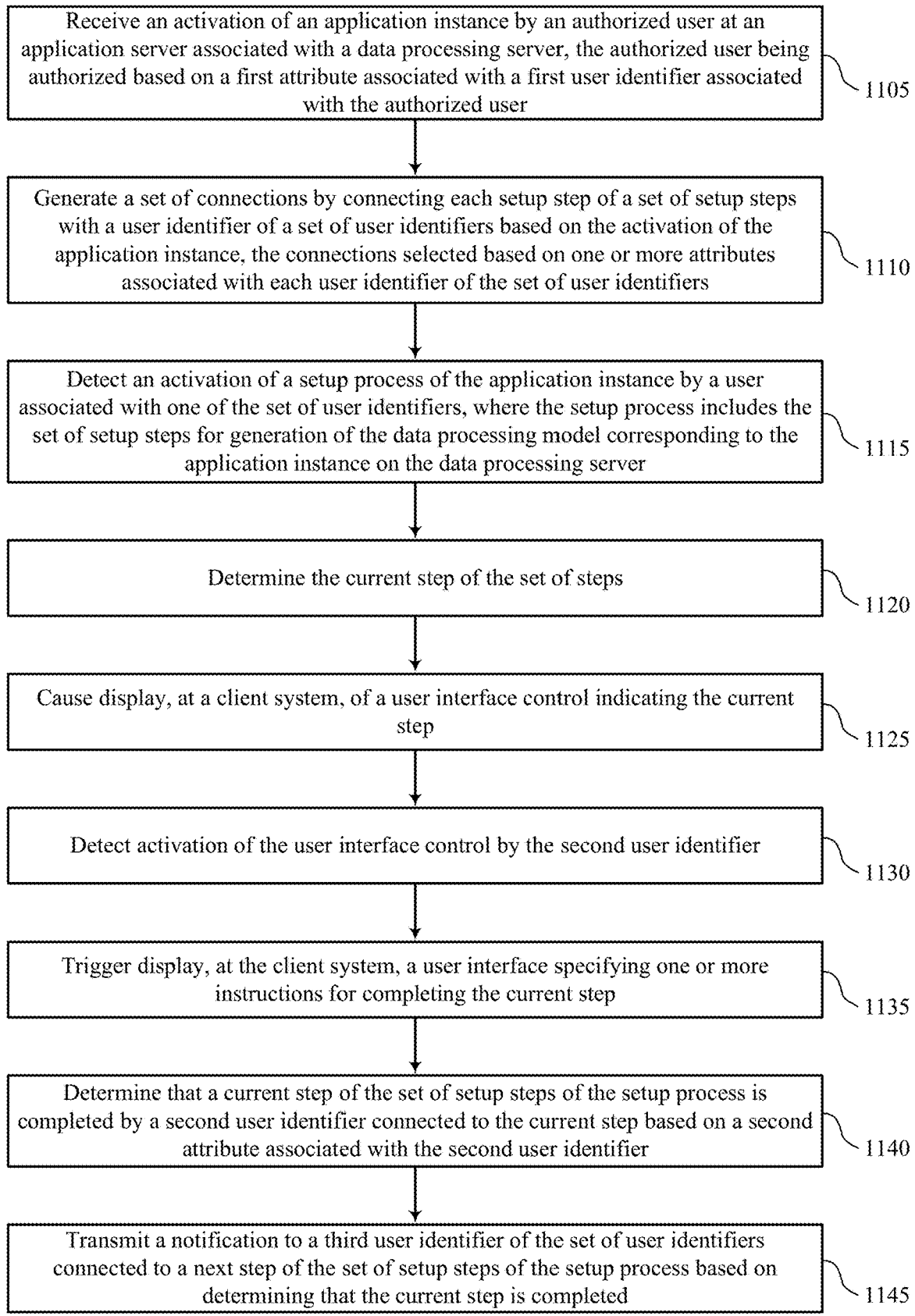

FIG. 11 shows a flowchart illustrating a method 1100 that supports distributing data management setup between multiple users in accordance with aspects of the present disclosure. The operations of method 1100 may be implemented by an application server or its components as described herein. For example, the operations of method 1100 may be performed by an application manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may receive an activation of an application instance by an authorized user at an application server associated with a data processing server, the authorized user being authorized based on a first attribute associated with a first user identifier associated with the authorized user. The operations of 1105 may be performed according to the methods described herein. In some examples, aspects of the operations of 1105 may be performed by an application instance activation component as described with reference to FIGS. 7 through 9.

At 1110, the application server may generate a set of connections by connecting each setup step of a set of setup steps with a user identifier of a set of user identifiers based on the activation of the application instance, the connections selected based on one or more attributes associated with each user identifier of the set of user identifiers. The operations of 1110 may be performed according to the methods described herein. In some examples, aspects of the operations of 1110 may be performed by a connection generating component as described with reference to FIGS. 7 through 9.

At 1115, the application server may detect an activation of a setup process of the application instance by a user associated with one of the set of user identifiers, where the setup process includes the set of setup steps for generation of the data processing model corresponding to the application instance on the data processing server. The operations of 1115 may be performed according to the methods described herein. In some examples, aspects of the operations of 1115 may be performed by a setup activation component as described with reference to FIGS. 7 through 9.

At 1120, the application server may determine the current step of the set of steps. The operations of 1120 may be performed according to the methods described herein. In some examples, aspects of the operations of 1120 may be performed by a progress component as described with reference to FIGS. 7 through 9.

At 1125, the application server may trigger display, at a client system, of a user interface control indicating the current step. The operations of 1125 may be performed according to the methods described herein. In some examples, aspects of the operations of 1125 may be performed by an user interface component as described with reference to FIGS. 7 through 9.

At 1130, the application server may detect activation of the user interface control by the second user identifier. The operations of 1130 may be performed according to the methods described herein. In some examples, aspects of the operations of 1130 may be performed by an user interface component as described with reference to FIGS. 7 through 9.

At 1135, the application server may trigger display, at the client system, a user interface specifying one or more instructions for completing the current step. The operations of 1135 may be performed according to the methods described herein. In some examples, aspects of the operations of 1135 may be performed by an user interface component as described with reference to FIGS. 7 through 9.

At 1140, the application server may determine that a current step of the set of setup steps of the setup process is completed by a second user identifier connected to the current step based on a second attribute associated with the second user identifier. The operations of 1140 may be performed according to the methods described herein. In some examples, aspects of the operations of 1140 may be performed by a progress component as described with reference to FIGS. 7 through 9.

At 1145, the application server may transmit a notification to a third user identifier of the set of user identifiers connected to a next step of the set of setup steps of the setup process based on determining that the current step is completed. The operations of 1145 may be performed according to the methods described herein. In some examples, aspects of the operations of 1145 may be performed by a notification component as described with reference to FIGS. 7 through 9.

Figure 12:
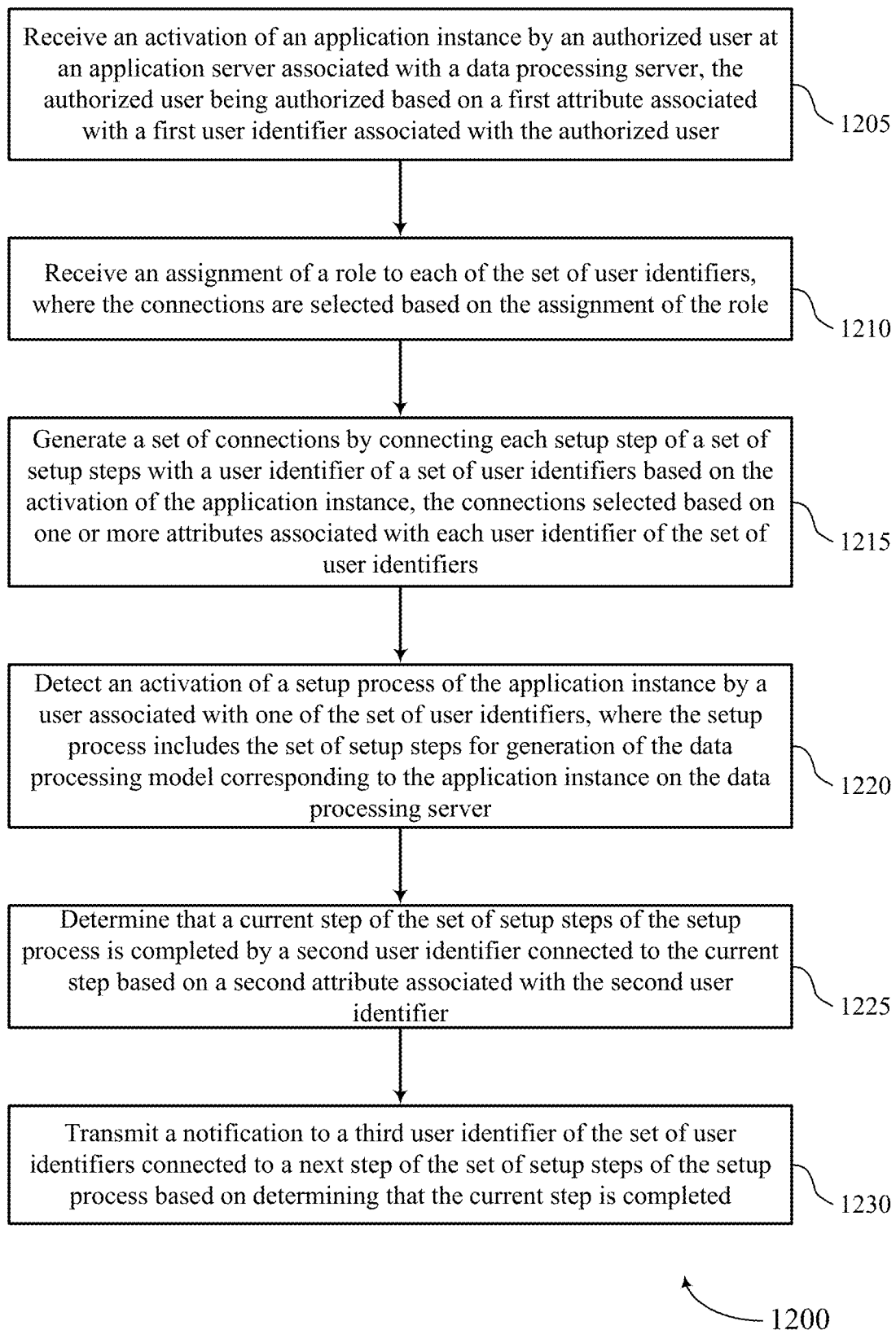

FIG. 12 shows a flowchart illustrating a method 1200 that supports distributing data management setup between multiple users in accordance with aspects of the present disclosure. The operations of method 1200 may be implemented by an application server or its components as described herein. For example, the operations of method 1200 may be performed by an application manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may receive an activation of an application instance by an authorized user at an application server associated with a data processing server, the authorized user being authorized based on a first attribute associated with a first user identifier associated with the authorized user. The operations of 1205 may be performed according to the methods described herein. In some examples, aspects of the operations of 1205 may be performed by an application instance activation component as described with reference to FIGS. 7 through 9.

At 1210, the application server may receive an assignment of a role to each of the set of user identifiers, where the connections are selected based on the assignment of the role. The operations of 1210 may be performed according to the methods described herein. In some examples, aspects of the operations of 1210 may be performed by a role assignment component as described with reference to FIGS. 7 through 9.

At 1215, the application server may generate a set of connections by connecting each setup step of a set of setup steps with a user identifier of a set of user identifiers based on the activation of the application instance, the connections selected based on one or more attributes associated with each user identifier of the set of user identifiers. The operations of 1215 may be performed according to the methods described herein. In some examples, aspects of the operations of 1215 may be performed by a connection generating component as described with reference to FIGS. 7 through 9.

At 1220, the application server may detect an activation of a setup process of the application instance by a user associated with one of the set of user identifiers, where the setup process includes the set of setup steps for generation of the data processing model corresponding to the application instance on the data processing server. The operations of 1220 may be performed according to the methods described herein. In some examples, aspects of the operations of 1220 may be performed by a setup activation component as described with reference to FIGS. 7 through 9.

At 1225, the application server may determine that a current step of the set of setup steps of the setup process is completed by a second user identifier connected to the current step based on a second attribute associated with the second user identifier. The operations of 1225 may be performed according to the methods described herein. In some examples, aspects of the operations of 1225 may be performed by a progress component as described with reference to FIGS. 7 through 9.

At 1230, the application server may transmit a notification to a third user identifier of the set of user identifiers connected to a next step of the set of setup steps of the setup process based on determining that the current step is completed. The operations of 1230 may be performed according to the methods described herein. In some examples, aspects of the operations of 1230 may be performed by a notification component as described with reference to FIGS. 7 through 9.

Figure 13:
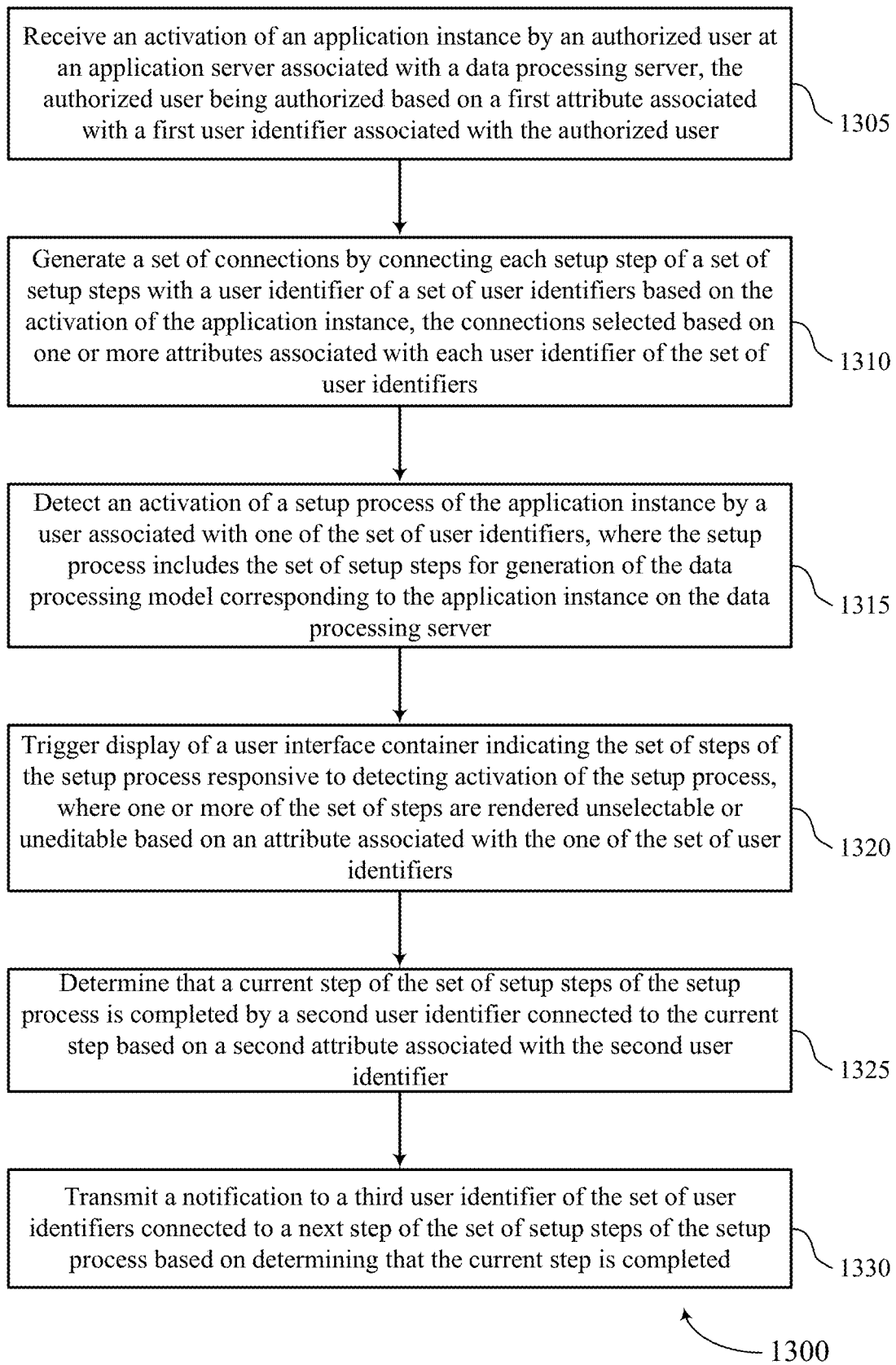

FIG. 13 shows a flowchart illustrating a method 1300 that supports distributing data management setup between multiple users in accordance with aspects of the present disclosure. The operations of method 1300 may be implemented by an application server or its components as described herein. For example, the operations of method 1300 may be performed by an application manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1305, the application server may receive an activation of an application instance by an authorized user at an application server associated with a data processing server, the authorized user being authorized based on a first attribute associated with a first user identifier associated with the authorized user. The operations of 1305 may be performed according to the methods described herein. In some examples, aspects of the operations of 1305 may be performed by an application instance activation component as described with reference to FIGS. 7 through 9.

At 1310, the application server may generate a set of connections by connecting each setup step of a set of setup steps with a user identifier of a set of user identifiers based on the activation of the application instance, the connections selected based on one or more attributes associated with each user identifier of the set of user identifiers. The operations of 1310 may be performed according to the methods described herein. In some examples, aspects of the operations of 1310 may be performed by a connection generating component as described with reference to FIGS. 7 through 9.

At 1315, the application server may detect an activation of a setup process of the application instance by a user associated with one of the set of user identifiers, where the setup process includes the set of setup steps for generation of the data processing model corresponding to the application instance on the data processing server. The operations of 1315 may be performed according to the methods described herein. In some examples, aspects of the operations of 1315 may be performed by a setup activation component as described with reference to FIGS. 7 through 9.

At 1320, the application server may trigger display of a user interface container indicating the set of steps of the setup process responsive to detecting activation of the setup process, where one or more of the set of steps are rendered unselectable or uneditable based on an attribute associated with the one of the set of user identifiers. The operations of 1320 may be performed according to the methods described herein. In some examples, aspects of the operations of 1320 may be performed by an user interface component as described with reference to FIGS. 7 through 9.

At 1325, the application server may determine that a current step of the set of setup steps of the setup process is completed by a second user identifier connected to the current step based on a second attribute associated with the second user identifier. The operations of 1325 may be performed according to the methods described herein. In some examples, aspects of the operations of 1325 may be performed by a progress component as described with reference to FIGS. 7 through 9.

At 1330, the application server may transmit a notification to a third user identifier of the set of user identifiers connected to a next step of the set of setup steps of the setup process based on determining that the current step is completed. The operations of 1330 may be performed according to the methods described herein. In some examples, aspects of the operations of 1330 may be performed by a notification component as described with reference to FIGS. 7 through 9.

Figure 14:
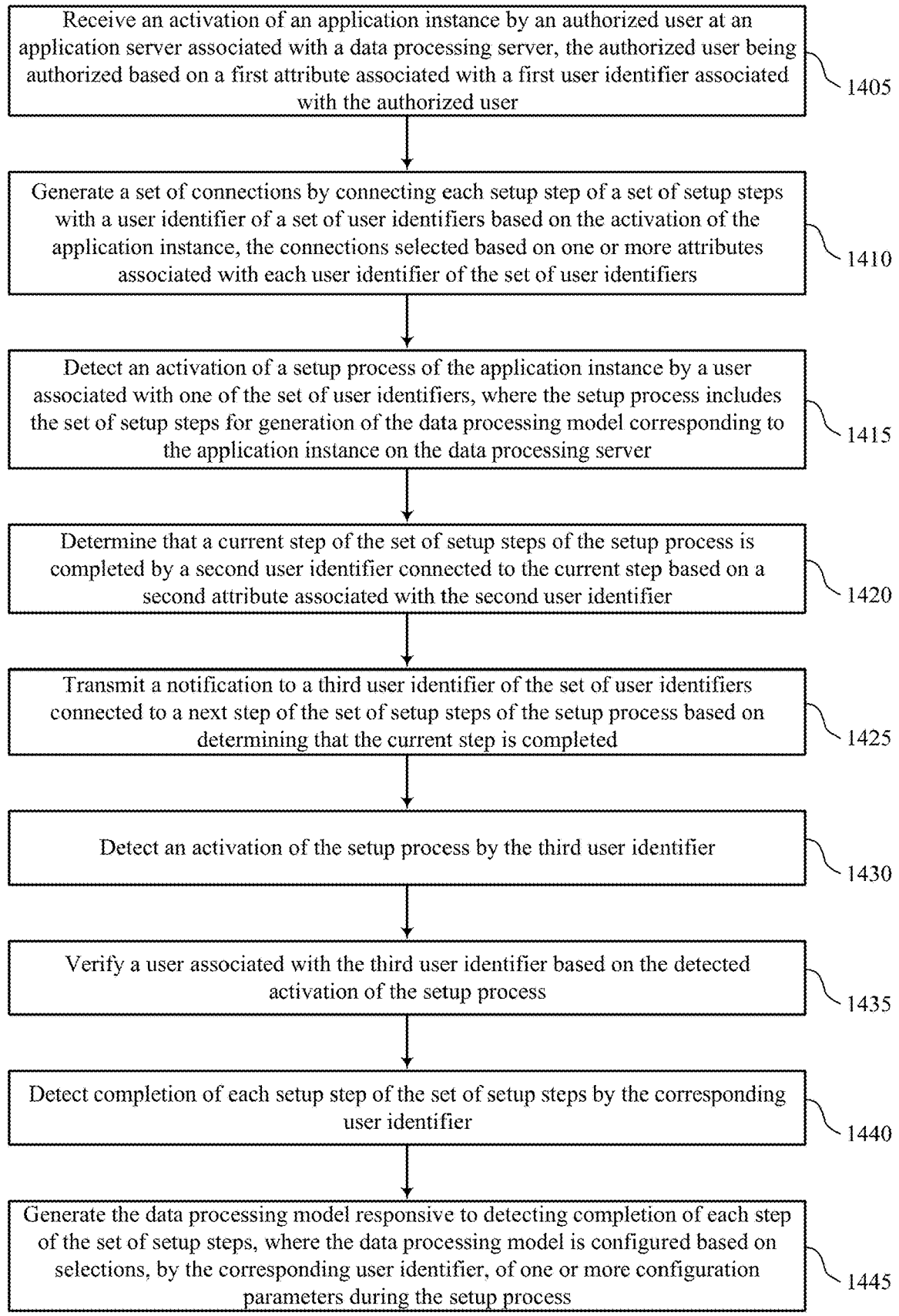

FIG. 14 shows a flowchart illustrating a method 1400 that supports distributing data management setup between multiple users in accordance with aspects of the present disclosure. The operations of method 1400 may be implemented by an application server or its components as described herein. For example, the operations of method 1400 may be performed by an application manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1405, the application server may receive an activation of an application instance by an authorized user at an application server associated with a data processing server, the authorized user being authorized based on a first attribute associated with a first user identifier associated with the authorized user. The operations of 1405 may be performed according to the methods described herein. In some examples, aspects of the operations of 1405 may be performed by an application instance activation component as described with reference to FIGS. 7 through 9.

At 1410, the application server may generate a set of connections by connecting each setup step of a set of setup steps with a user identifier of a set of user identifiers based on the activation of the application instance, the connections selected based on one or more attributes associated with each user identifier of the set of user identifiers. The operations of 1410 may be performed according to the methods described herein. In some examples, aspects of the operations of 1410 may be performed by a connection generating component as described with reference to FIGS. 7 through 9.

At 1415, the application server may detect an activation of a setup process of the application instance by a user associated with one of the set of user identifiers, where the setup process includes the set of setup steps for generation of the data processing model corresponding to the application instance on the data processing server. The operations of 1415 may be performed according to the methods described herein. In some examples, aspects of the operations of 1415 may be performed by a setup activation component as described with reference to FIGS. 7 through 9.

At 1420, the application server may determine that a current step of the set of setup steps of the setup process is completed by a second user identifier connected to the current step based on a second attribute associated with the second user identifier. The operations of 1420 may be performed according to the methods described herein. In some examples, aspects of the operations of 1420 may be performed by a progress component as described with reference to FIGS. 7 through 9.

At 1425, the application server may transmit a notification to a third user identifier of the set of user identifiers connected to a next step of the set of setup steps of the setup process based on determining that the current step is completed. The operations of 1425 may be performed according to the methods described herein. In some examples, aspects of the operations of 1425 may be performed by a notification component as described with reference to FIGS. 7 through 9.

At 1430, the application server may detect an activation of the setup process by the third user identifier. The operations of 1430 may be performed according to the methods described herein. In some examples, aspects of the operations of 1430 may be performed by a setup activation component as described with reference to FIGS. 7 through 9.

At 1435, the application server may verify a user associated with the third user identifier based on the detected activation of the setup process. The operations of 1435 may be performed according to the methods described herein. In some examples, aspects of the operations of 1435 may be performed by a verification component as described with reference to FIGS. 7 through 9.

At 1440, the application server may detect completion of each setup step of the set of setup steps by the corresponding user identifier. The operations of 1440 may be performed according to the methods described herein. In some examples, aspects of the operations of 1440 may be performed by a progress component as described with reference to FIGS. 7 through 9.

At 1445, the application server may generate the data processing model responsive to detecting completion of each step of the set of setup steps, where the data processing model is configured based on selections, by the corresponding user identifier, of one or more configuration parameters during the setup process. The operations of 1445 may be performed according to the methods described herein. In some examples, aspects of the operations of 1445 may be performed by a data processing model generation component as described with reference to FIGS. 7 through 9.

Figure 15:
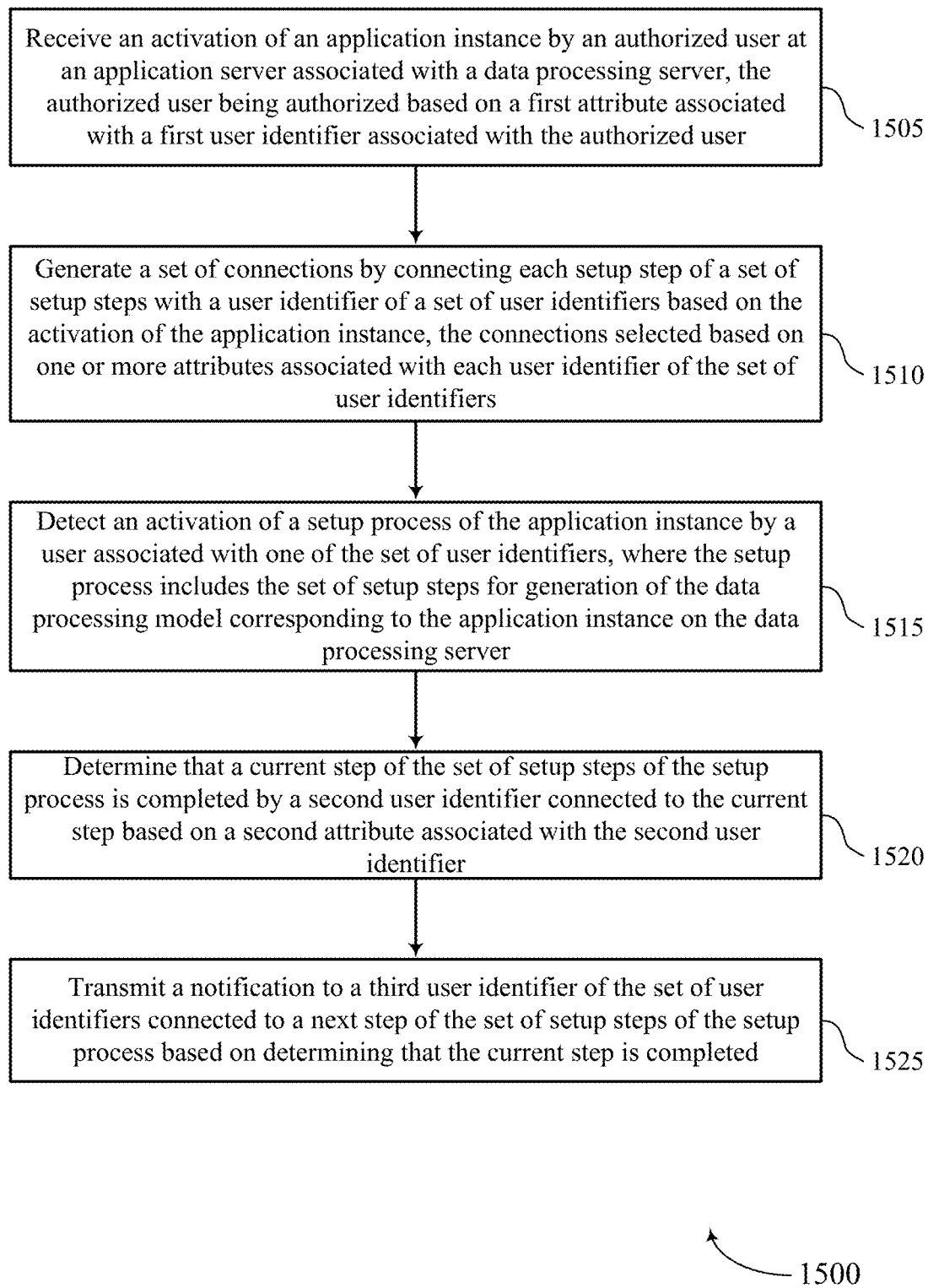

FIG. 15 shows a flowchart illustrating a method 1500 that supports distributing data management setup between multiple users in accordance with aspects of the present disclosure. The operations of method 1500 may be implemented by an application server or its components as described herein. For example, the operations of method 1500 may be performed by an application manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1505, the application server may receive an activation of an application instance by an authorized user at an application server associated with a data processing server, the authorized user being authorized based on a first attribute associated with a first user identifier associated with the authorized user. The operations of 1505 may be performed according to the methods described herein. In some examples, aspects of the operations of 1505 may be performed by an application instance activation component as described with reference to FIGS. 7 through 9.

At 1510, the application server may generate a set of connections by connecting each setup step of a set of setup steps with a user identifier of a set of user identifiers based on the activation of the application instance, the connections selected based on one or more attributes associated with each user identifier of the set of user identifiers. The operations of 1510 may be performed according to the methods described herein. In some examples, aspects of the operations of 1510 may be performed by a connection generating component as described with reference to FIGS. 7 through 9.

At 1515, the application server may detect an activation of a setup process of the application instance by a user associated with one of the set of user identifiers, where the setup process includes the set of setup steps for generation of the data processing model corresponding to the application instance on the data processing server. The operations of 1515 may be performed according to the methods described herein. In some examples, aspects of the operations of 1515 may be performed by a setup activation component as described with reference to FIGS. 7 through 9.

At 1520, the application server may determine that a current step of the set of setup steps of the setup process is completed by a second user identifier connected to the current step based on a second attribute associated with the second user identifier. The operations of 1520 may be performed according to the methods described herein. In some examples, aspects of the operations of 1520 may be performed by a progress component as described with reference to FIGS. 7 through 9.

At 1525, the application server may transmit a notification to a third user identifier of the set of user identifiers connected to a next step of the set of setup steps of the setup process based on determining that the current step is completed. The operations of 1525 may be performed according to the methods described herein. In some examples, aspects of the operations of 1525 may be performed by a notification component as described with reference to FIGS. 7 through 9.

A method of generating a data processing model including is described. The method may include receiving an activation of an application instance by an authorized user at an application server associated with a data processing server, the authorized user being authorized based on a first attribute associated with a first user identifier associated with the authorized user, generating a set of connections by connecting each setup step of a set of setup steps with a user identifier of a set of user identifiers based on the activation of the application instance, the connections selected based on one or more attributes associated with each user identifier of the set of user identifiers, detecting an activation of a setup process of the application instance by a user associated with one of the set of user identifiers, where the setup process includes the set of setup steps for generation of the data processing model corresponding to the application instance on the data processing server, determining that a current step of the set of setup steps of the setup process is completed by a second user identifier connected to the current step based on a second attribute associated with the second user identifier, and transmitting a notification to a third user identifier of the set of user identifiers connected to a next step of the set of setup steps of the setup process based on determining that the current step is completed.

An apparatus for generating a data processing model including is described. The apparatus may include a processor, memory coupled with the processor, and instructions stored in the memory. The instructions may be executable by the processor to cause the apparatus to receive an activation of an application instance by an authorized user at an application server associated with a data processing server, the authorized user being authorized based on a first attribute associated with a first user identifier associated with the authorized user, generate a set of connections by connecting each setup step of a set of setup steps with a user identifier of a set of user identifiers based on the activation of the application instance, the connections selected based on one or more attributes associated with each user identifier of the set of user identifiers, detect an activation of a setup process of the application instance by a user associated with one of the set of user identifiers, where the setup process includes the set of setup steps for generation of the data processing model corresponding to the application instance on the data processing server, determine that a current step of the set of setup steps of the setup process is completed by a second user identifier connected to the current step based on a second attribute associated with the second user identifier, and transmit a notification to a third user identifier of the set of user identifiers connected to a next step of the set of setup steps of the setup process based on determining that the current step is completed.

Another apparatus for generating a data processing model including is described. The apparatus may include means for receiving an activation of an application instance by an authorized user at an application server associated with a data processing server, the authorized user being authorized based on a first attribute associated with a first user identifier associated with the authorized user, generating a set of connections by connecting each setup step of a set of setup steps with a user identifier of a set of user identifiers based on the activation of the application instance, the connections selected based on one or more attributes associated with each user identifier of the set of user identifiers, detecting an activation of a setup process of the application instance by a user associated with one of the set of user identifiers, where the setup process includes the set of setup steps for generation of the data processing model corresponding to the application instance on the data processing server, determining that a current step of the set of setup steps of the setup process is completed by a second user identifier connected to the current step based on a second attribute associated with the second user identifier, and transmitting a notification to a third user identifier of the set of user identifiers connected to a next step of the set of setup steps of the setup process based on determining that the current step is completed.

A non-transitory computer-readable medium storing code for generating a data processing model including is described. The code may include instructions executable by a processor to receive an activation of an application instance by an authorized user at an application server associated with a data processing server, the authorized user being authorized based on a first attribute associated with a first user identifier associated with the authorized user, generate a set of connections by connecting each setup step of a set of setup steps with a user identifier of a set of user identifiers based on the activation of the application instance, the connections selected based on one or more attributes associated with each user identifier of the set of user identifiers, detect an activation of a setup process of the application instance by a user associated with one of the set of user identifiers, where the setup process includes the set of setup steps for generation of the data processing model corresponding to the application instance on the data processing server, determine that a current step of the set of setup steps of the setup process is completed by a second user identifier connected to the current step based on a second attribute associated with the second user identifier, and transmit a notification to a third user identifier of the set of user identifiers connected to a next step of the set of setup steps of the setup process based on determining that the current step is completed.

Some examples of the method, apparatuses, and non-transitory computer-readable medium described herein may further include operations, features, means, or instructions for determining the current step of the set of steps, and triggering display, at a client system, of a user interface control indicating the current step.

Some examples of the method, apparatuses, and non-transitory computer-readable medium described herein may further include operations, features, means, or instructions for detecting activation of the user interface control by the second user identifier, and triggering display, at the client system, a user interface specifying one or more instructions for completing the current step.

In some examples of the method, apparatuses, and non-transitory computer-readable medium described herein, connecting each step with the user identifier of the set of user identifiers further may include operations, features, means, or instructions for receiving an assignment of a role to each of the set of user identifiers, where the connections may be selected based on the assignment of the role.

Some examples of the method, apparatuses, and non-transitory computer-readable medium described herein may further include operations, features, means, or instructions for triggering display of a user interface container indicating the set of steps of the setup process responsive to detecting activation of the setup process, where one or more of the set of steps may be rendered unselectable or uneditable based on an attribute associated with the one of the set of user identifiers.

Some examples of the method, apparatuses, and non-transitory computer-readable medium described herein may further include operations, features, means, or instructions for triggering display of a user interface container indicating a progress associated with the setup process, the next step in the setup process, one or more user identifiers associated with completed steps of the setup process, one or more times associated with completion of one or more steps of the setup process, or a combination thereof.

Some examples of the method, apparatuses, and non-transitory computer-readable medium described herein may further include operations, features, means, or instructions for generating a displayable indicator upon completion of each of the set of steps by one or more of the set of user identifiers, and associating the displayable indicator with the one or more of the set of user identifiers.

In some examples of the method, apparatuses, and non-transitory computer-readable medium described herein, each step of the set of steps may be associated with at least one skill tag, and where each of the one or more of the set of user identifiers that completes a step may be further associated with the corresponding skill tag.

Some examples of the method, apparatuses, and non-transitory computer-readable medium described herein may further include operations, features, means, or instructions for detecting an activation of the setup process by the third user identifier, and verifying a user associated with the third user identifier based on the detected activation of the setup process.

Some examples of the method, apparatuses, and non-transitory computer-readable medium described herein may further include operations, features, means, or instructions for triggering display of a set of user interface tiles responsive to detecting activation of the activation of the application instance, where the set of user interface tiles includes a recommended application tile, a data processing model metrics tile associated with the data processing model, a setup process progress tile, a recommended setup process tile, or a combination thereof.

In some examples of the method, apparatuses, and non-transitory computer-readable medium described herein, the set of user interface tiles may be determined based on utilization metrics of the application, utilization metrics of utilization of the application instance by one or more of the set of user identifiers, a role associated with the authorized user, or a combination thereof.

Some examples of the method, apparatuses, and non-transitory computer-readable medium described herein may further include operations, features, means, or instructions for detecting completion of each setup step of the set of setup steps by the corresponding user identifier, and generating the data processing model responsive to detecting completion of each step of the set of setup steps, where the data processing model may be configured based on selections, by the corresponding user identifier, of one or more configuration parameters during the setup process.

Some examples of the method, apparatuses, and non-transitory computer-readable medium described herein may further include operations, features, means, or instructions for storing a configuration state of the setup process at the application server responsive to determining that the current step may be completed, detecting an activation of the setup process by the third user identifier, and retrieving the configuration state of the setup process based on detecting the activation of the setup process by the third user identifier.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating a data processing model at an application server, comprising:
   receiving an activation of an application instance from an authorized user identifier at a user interface associated with the application server, the authorized user identifier being authorized based at least in part on a first set of data attributes associated with the authorized user identifier;
   receiving, at the user interface, an assignment of a first role to a second user identifier and a second role to a third user identifier, the first role being assigned to the second user identifier based at least in part on a second set of data attributes associated with the second user identifier, the second role being assigned to the third user identifier based at least in part on a third set of data attributes associated with the second user identifier;
   generating, at the application server, a plurality of connections by connecting a first setup step of a plurality of setup steps with the second user identifier and by connecting a second setup step of the plurality of setup steps with the third user identifier, the plurality of connections generated based at least in part on the first role corresponding to the first setup step and on the second role corresponding to the second setup step;
   detecting that a setup process of the application instance has been activated by the authorized user identifier at the user interface, wherein the setup process includes the plurality of setup steps for generating the data processing model;
   triggering display of two or more user interface tiles at the user interface in response to detecting that the setup process has been activated, the two or more user interface tiles indicating a set of utilization metrics associated with the data processing model, a set of recommended actions for the setup process, and instructions for completing the plurality of setup steps;
   determining that the second user identifier has completed the first setup step based at least in part on the second user identifier interacting with the two or more user interface tiles at the user interface;
   transmitting a notification to the third user identifier in response to the second user identifier completing the first setup step and based at least in part on the third user identifier being connected to the second setup step; and
   generating the data processing model for the application instance at the application server based at least in part on determining that the setup process is complete, wherein the data processing model supports digital communication transmission, digital communication feedback, and digital communication analytics for the application instance.

2. The method of claim 1, further comprising:
   determining the first setup step of the plurality of setup steps; and
   triggering display, at a client system, of a user interface control indicating the first setup step.

3. The method of claim 2, further comprising:
   detecting activation of the user interface control by the second user identifier; and
   triggering display, at the client system, of the user interface specifying one or more instructions for completing the first setup step.

4. The method of claim 1, wherein connecting the first setup step with the second user identifier and the second setup step with the third user identifier further comprises:
selecting the plurality of connections based at least in part on determining that the first setup step comprises one or more actions associated with the first role and the second setup step comprises one or more actions associated with the second role.

5. The method of claim 1, further comprising:
triggering display of a user interface container indicating the plurality of setup steps of the setup process responsive to detecting activation of the setup process, wherein one or more of the plurality of setup steps are rendered unselectable or uneditable based on a data attribute of the second set of data attributes or the third set of data attributes.

6. The method of claim 1, further comprising:
triggering display of a user interface container indicating a progress associated with the setup process, the second setup step in the setup process, a third setup step in the setup process, one or more user identifiers associated with completed steps of the setup process, one or more times associated with completion of the plurality of setup steps of the setup process, or a combination thereof.

7. The method of claim 1, further comprising:
generating a displayable indicator based at least in part on completion of the first setup step of the plurality of setup steps by the second user identifier and on completion of the second setup step of the plurality of setup steps by the third user identifier; and
associating the displayable indicator with the second user identifier and the third user identifier.

8. The method of claim 1, further comprising:
associating the second user identifier with at least one skill tag in response to the second user identifier completing the first setup step of the plurality of setup steps.

9. The method of claim 1, further comprising:
detecting an activation of the setup process by the third user identifier; and
verifying the third user identifier based at least in part on detecting the activation of the setup process.

10. The method of claim 1, further comprising:
triggering display of a set of user interface tiles responsive to detecting activation of the application instance, wherein the set of user interface tiles includes a recommended application tile, a data processing model metrics tile associated with the data processing model, a setup process progress tile, a recommended setup process tile, or a combination thereof.

11. The method of claim 10, wherein the set of user interface tiles is determined based at least in part on utilization metrics of the application instance, utilization metrics of the second user identifier or the third user identifier, a role associated with the authorized user identifier, or a combination thereof.

12. The method of claim 1, further comprising:
detecting completion of each setup step of the plurality of setup steps by a corresponding user identifier, wherein the data processing model is generated responsive to detecting completion of each setup step of the plurality of setup steps, and wherein the data processing model is configured based on selections, by the corresponding user identifier, of one or more configuration parameters during the setup process.

13. The method of claim 1, further comprising:
storing a configuration state of the setup process at the application server responsive to determining that the first setup step is completed;
detecting an activation of the setup process by the third user identifier; and
retrieving the configuration state of the setup process based at least in part on detecting the activation of the setup process by the third user identifier.

14. An apparatus for generating a data processing model at an application server, comprising:
a processor,
memory coupled with the processor; and
instructions stored in the memory and executable by the processor to cause the apparatus to:
receive an activation of an application instance from an authorized user identifier at a user interface associated with the application server, the authorized user identifier being authorized based at least in part on a first set of data attributes associated with the authorized user identifier;
receive, at the user interface, an assignment of a first role to a second user identifier and a second role to a third user identifier, the first role being assigned to the second user identifier based at least in part on a second set of data attributes associated with the second user identifier, the second role being assigned to the third user identifier based at least in part on a third set of data attributes associated with the second user identifier;
generate, at the application server, a plurality of connections by connecting a first setup step of a plurality of setup steps with the second user identifier and by connecting a second setup step of the plurality of setup steps with the third user identifier, the plurality of connections generated based at least in part on the first role corresponding to the first setup step and on the second role corresponding to the second setup step;
detect that a setup process of the application instance has been activated by the authorized user identifier at the user interface, wherein the setup process includes the plurality of setup steps for generating the data processing model;
trigger display of two or more user interface tiles at the user interface in response to detecting that the setup process has been activated, the two or more user interface tiles indicating a set of utilization metrics associated with the data processing model, a set of recommended actions for the setup process, and instructions for completing the plurality of setup steps;
determine that the second user identifier has completed the first setup step based at least in part on the second user identifier interacting with the two or more user interface tiles at the user interface;
transmit a notification to the third user identifier in response to the second user identifier completing the first setup step and based at least in part on the third user identifier being connected to the second setup step; and
generate the data processing model for the application instance at the application server based at least in part on determining that the setup process is complete, wherein the data processing model supports digital communication transmission, digital communication feedback, and digital communication analytics for the application instance.

15. The apparatus of claim 14, wherein the instructions are further executable by the processor to cause the apparatus to:
  determine the first setup step of the plurality of setup steps; and
  trigger display, at a client system, of a user interface control indicating the first setup step.

16. The apparatus of claim 15, wherein the instructions are further executable by the processor to cause the apparatus to:
  detect activation of the user interface control by the second user identifier; and
  trigger display, at the client system, of the user interface specifying one or more instructions for completing the first setup step.

17. The apparatus of claim 14, wherein the instructions are further executable by the processor to cause the apparatus to:
  trigger display of a user interface container indicating the plurality of setup steps of the setup process responsive to detecting activation of the setup process, wherein one or more of the plurality of setup steps are rendered unselectable or uneditable based on a data attribute of the second set of data attributes or the third set of data attributes.

18. The apparatus of claim 14, wherein the instructions are further executable by the processor to cause the apparatus to:
  trigger display of a user interface container indicating a progress associated with the setup process, the second setup step in the setup process, a third setup step in the setup process, one or more user identifiers associated with completed steps of the setup process, one or more times associated with completion of the plurality of setup steps of the setup process, or a combination thereof.

19. A non-transitory computer-readable medium storing code for generating a data processing model at an application server, the code comprising instructions executable by a processor to:
  receive an activation of an application instance from an authorized user identifier at a user interface associated with the application server, the authorized user identifier being authorized based at least in part on a first set of data attributes associated with the authorized user identifier;
  receive, at the user interface, an assignment of a first role to a second user identifier and a second role to a third user identifier, the first role being assigned to the second user identifier based at least in part on a second set of data attributes associated with the second user identifier, the second role being assigned to the third user identifier based at least in part on a third set of data attributes associated with the second user identifier;
  generate, at the application server, a plurality of connections by connecting a first setup step of a plurality of setup steps with the second user identifier and by connecting a second setup step of the plurality of setup steps with the third user identifier, the plurality of connections generated based at least in part on the first role corresponding to the first setup step and on the second role corresponding to the second setup step;
  detect that a setup process of the application instance has been activated by the authorized user identifier at the user interface, wherein the setup process includes the plurality of setup steps for generating the data processing model;
  trigger display of two or more user interface tiles at the user interface in response to detecting that the setup process has been activated, the two or more user interface tiles indicating a set of utilization metrics associated with the data processing model, a set of recommended actions for the setup process, and instructions for completing the plurality of setup steps;
  determine that the second user identifier has completed the first setup step based at least in part on the second user identifier interacting with the two or more user interface tiles at the user interface;
  transmit a notification to the third user identifier in response to the second user identifier completing the first setup step and based at least in part on the third user identifier being connected to the second setup step; and
  generate the data processing model for the application instance at the application server based at least in part on determining that the setup process is complete, wherein the data processing model supports digital communication transmission, digital communication feedback, and digital communication analytics for the application instance.

20. The non-transitory computer-readable medium of claim 19, wherein the instructions are further executable to:
  determine the first setup step of the plurality of setup steps; and
  trigger display, at a client system, of a user interface control indicating the first setup step.

* * * * *